(12) United States Patent
O'Neill

(10) Patent No.: US 11,124,932 B1
(45) Date of Patent: Sep. 21, 2021

(54) RETROREFLECTIVE TRAFFIC STRIPE FOR BOTH DRY AND WET WEATHER CONDITIONS

(71) Applicant: Mark Joseph O'Neill, Keller, TX (US)

(72) Inventor: Mark Joseph O'Neill, Keller, TX (US)

( * ) Notice: Subject to any disclaimer, the term of this patent is extended or adjusted under 35 U.S.C. 154(b) by 0 days.

(21) Appl. No.: 17/245,215

(22) Filed: Apr. 30, 2021

(51) Int. Cl.
| | | |
|---|---|---|
| *E01F 9/00* | (2016.01) | |
| *E01F 9/576* | (2016.01) | |
| *G02B 5/122* | (2006.01) | |
| *E01F 9/512* | (2016.01) | |
| *E01F 9/524* | (2016.01) | |
| *G02B 1/04* | (2006.01) | |

(52) U.S. Cl.
CPC .............. *E01F 9/578* (2016.02); *E01F 9/512* (2016.02); *E01F 9/524* (2016.02); *G02B 1/04* (2013.01); *G02B 5/122* (2013.01)

(58) Field of Classification Search
CPC .......... E01F 9/512; E01F 9/524; E01F 9/578; G02B 1/04; G02B 5/122
USPC ........................................ 404/12–16, 93, 94
See application file for complete search history.

(56) References Cited

U.S. PATENT DOCUMENTS

| | | | | |
|---|---|---|---|---|
| 2,310,790 A * | 2/1943 | Jungersen | ................. | G02B 5/12 359/547 |
| 3,587,415 A * | 6/1971 | Eigenmann | ............. | E01F 9/578 404/14 |
| 3,975,083 A * | 8/1976 | Rowland | .................. | E01F 9/578 359/514 |
| 4,145,112 A * | 3/1979 | Crone | ..................... | E01F 9/512 359/531 |
| 4,349,598 A * | 9/1982 | White | .................... | G02B 5/124 359/530 |
| 5,501,545 A * | 3/1996 | Walter | .................... | G02B 5/124 359/531 |
| 5,759,468 A * | 6/1998 | Smith | .................... | G02B 5/124 264/16 |
| 6,021,559 A * | 2/2000 | Smith | ................. | B29C 33/3842 29/527.4 |
| 6,282,026 B1 * | 8/2001 | Dreyer | .................... | G02B 5/124 359/529 |
| 6,770,225 B2 * | 8/2004 | Nilsen | .................... | G02B 5/124 264/1.9 |

(Continued)

*Primary Examiner* — Raymond W Addie

(57) ABSTRACT

A retroreflective traffic stripe comprising an exposed top surface containing a widely spaced repeating pattern of linear light-turning prisms over a bottom surface containing two different types of cube corner retroreflective prisms. The light-turning prisms are configured to use refraction and reflection to redirect light from distant headlights into a downward direction onto the bottom surface of the traffic stripe. Cube corner retroreflective prisms of the first type on the bottom surface have optical axes which are substantially perpendicular to the surfaces of the traffic stripe and are located substantially beneath such light-turning prisms. Cube corner retroreflective prisms of the second type on the bottom surface have optical axes tilted toward the distant headlights by at least 25 degrees and are located substantially between such light-turning prisms. Under dry road conditions, the light-turning prisms and first type of cube corner prisms provide unprecedented levels of retroreflectivity. Under wet road conditions, the second type of cube corner prisms provide high levels of retroreflectivity.

19 Claims, 15 Drawing Sheets

(56) References Cited

U.S. PATENT DOCUMENTS

| | | | | |
|---|---|---|---|---|
| 6,883,921 B2* | 4/2005 | Mimura | ............... | G02B 5/124 |
| | | | | 359/529 |
| 6,891,677 B2* | 5/2005 | Nilsen | ................ | G02B 1/11 |
| | | | | 359/625 |
| 6,967,053 B1* | 11/2005 | Mullen | ................ | A42B 3/061 |
| | | | | 359/529 |
| 7,250,122 B2* | 7/2007 | Mullen | ................ | B29C 35/10 |
| | | | | 264/1.38 |
| 7,317,501 B2* | 1/2008 | Tanaka | ................ | G02B 5/08 |
| | | | | 156/462 |
| 7,384,161 B2* | 6/2008 | Benson | ................ | G02B 5/124 |
| | | | | 264/139 |
| 8,394,485 B2* | 3/2013 | Benson | ................ | B32B 3/28 |
| | | | | 428/167 |
| 9,010,945 B2* | 4/2015 | Vasylyev | ............ | G02B 5/124 |
| | | | | 359/530 |
| 2002/0006313 A1* | 1/2002 | Pas | ................ | E01F 9/594 |
| | | | | 404/13 |
| 2012/0050876 A1* | 3/2012 | Sugiyama | ............ | G02B 5/124 |
| | | | | 359/625 |
| 2018/0267216 A1* | 9/2018 | Otsubo | ................ | G02B 5/124 |
| 2020/0048847 A1* | 2/2020 | Retterath | ............ | G02B 5/124 |

* cited by examiner

Fig. 3
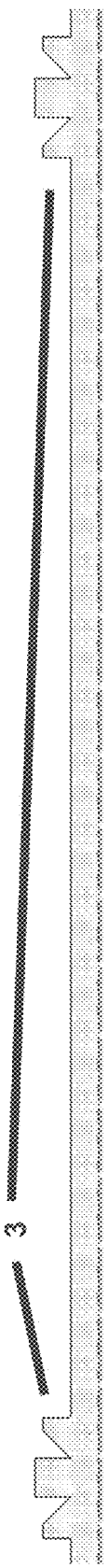
Fig. 3-A
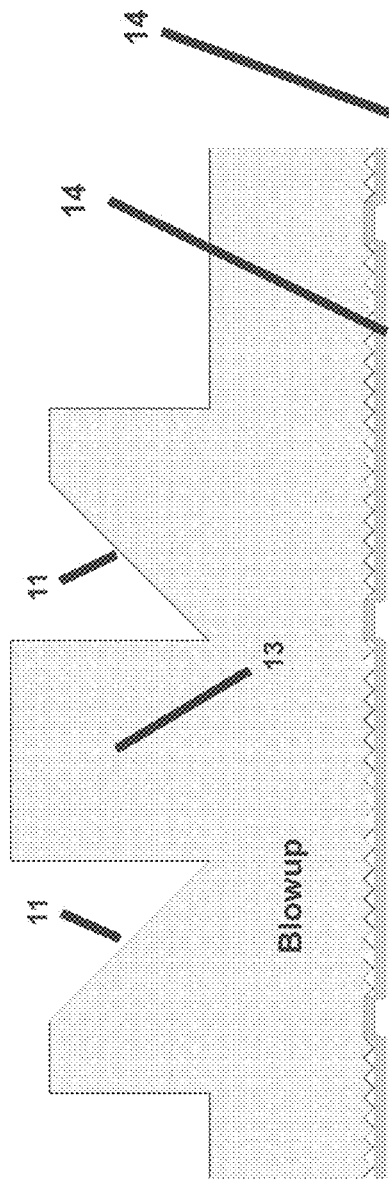
Fig. 3-B
Blowup
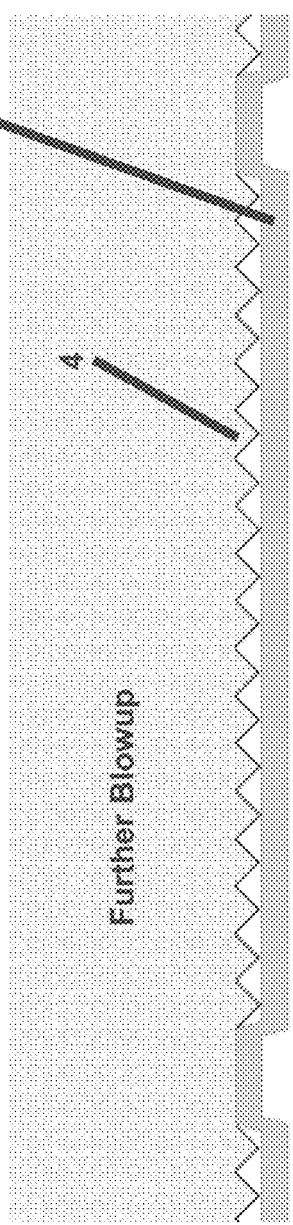
Fig. 3-C
Further Blowup

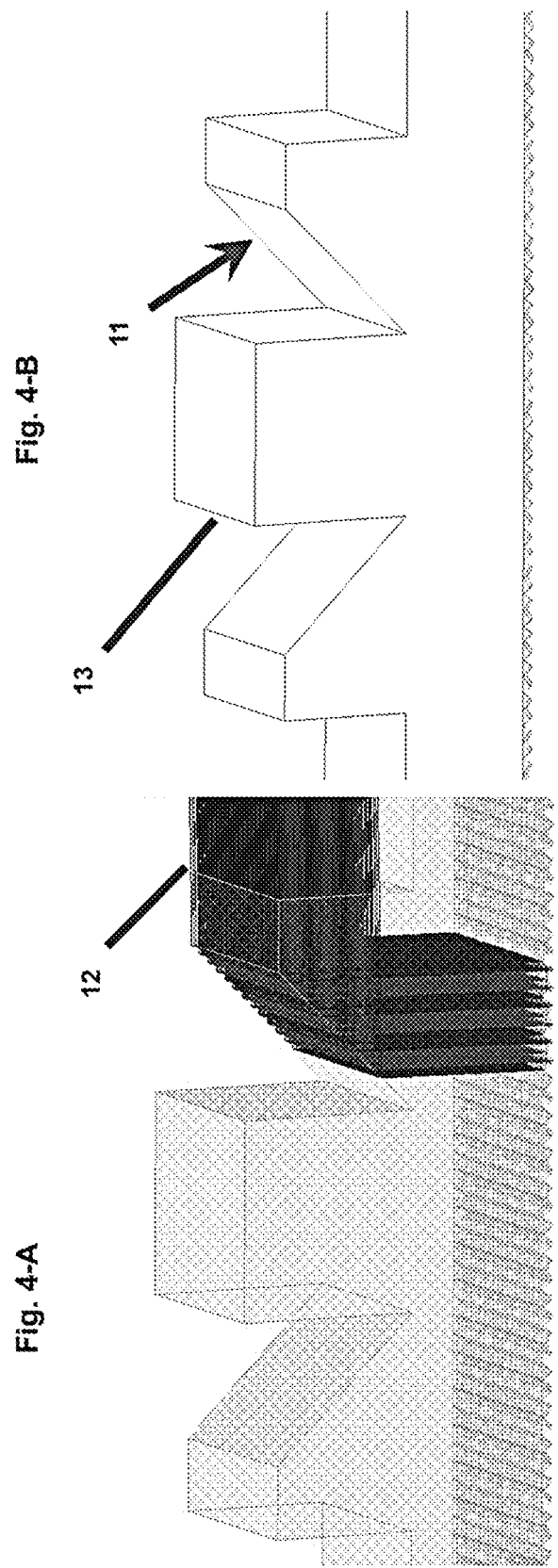
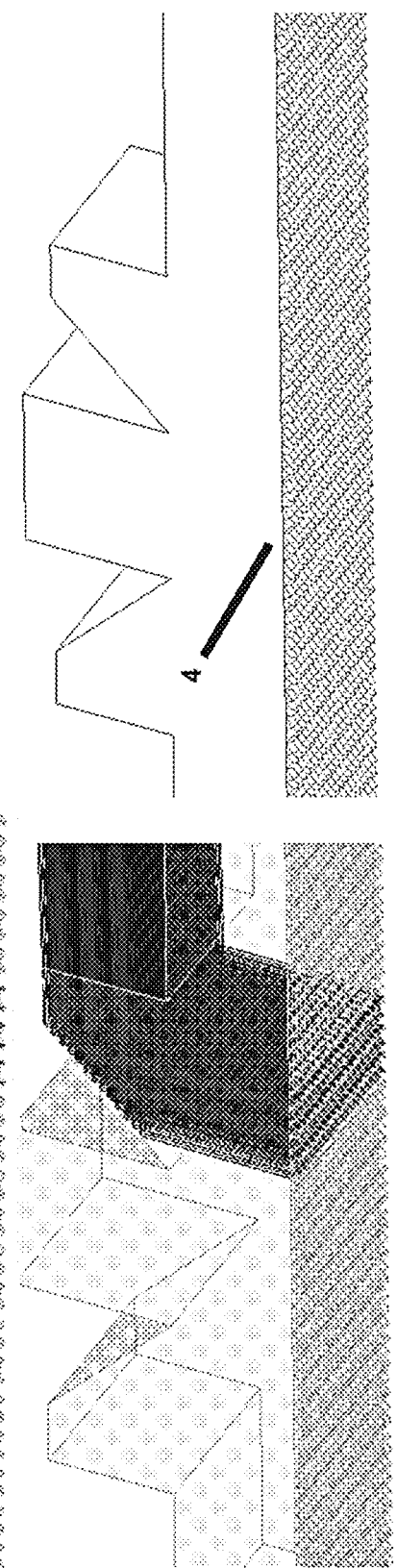
Fig. 4
Fig. 4-A
Fig. 4-B
Fig. 4-C
Fig. 4-D

Full Cube Corner Effectiveness of Perpendicular Axis and ± 35.3° Tilted Axis Prisms and Round Trip Transmittance

RETROREFLECTIVE TRAFFIC STRIPE FOR BOTH DRY AND WET WEATHER CONDITIONS

BACKGROUND OF THE INVENTION

This invention relates to retroreflective traffic stripes which are illuminated at night by the headlights of vehicles (cars, SUVs, trucks, and motorcycles) and which return a portion of the incident illumination by reflection to the drivers and sensors of these vehicles. Such traffic stripes are applied to or attached to the substantially horizontal surfaces of highways and widely used as (1) longitudinal lane delineation markers parallel to the lanes of traffic between lanes, (2) longitudinal road edge markers also parallel to the lanes of traffic, and (3) lateral markers perpendicular to the lanes of traffic at crosswalks and intersections. This invention further relates to retroreflective traffic stripes applied to the substantially vertical surfaces of guardrails and concrete barriers.

This invention represents an important improvement to a previous invention by the same inventor presented in U.S. Pat. No. 10,794,021, "Retroreflective Traffic Stripe," issued Oct. 6, 2020, hereafter referred to as the '021 patent. This previous invention relates to a traffic stripe which uses widely spaced apart light-turning prisms on its top surface to redirect incident rays from distant headlights downward onto cube corner prisms on its bottom surface. The cube corner prisms then retroreflect the light along a reverse path back to the driver and sensors of the vehicle with the headlights. This previous invention offers unprecedented performance under dry road conditions, with a retroreflectivity about 1,000× higher than conventional traffic stripes which use embedded glass or ceramic beads in paint.

The previous invention presented in the '021 patent is presently being developed under a National Academies-funded contract with the inventor's company, Mark O'Neill, LLC, as part of the competitive program known as the Transportation Research Board (TRB) Innovations Deserving Early Analysis (IDEA) program. The contract title is "A Retroreflective Road Lane Marking Tape 1,000× Brighter Than Existing Technology," and the period of performance is from Jan. 1, 2021 through Dec. 31, 2021. The first fully functional prototypes of the new traffic stripe will be built and tested under this program.

The present invention extends the high retroreflectivity of the previous invention to not only work under dry road conditions but also under wet road conditions, including a fully submerged underwater traffic stripe. The present invention accomplishes this wet performance by using a different configuration of cube corner prisms between light-turning prisms than under the light-turning prisms. Specifically, the cube corner prisms under the light-turning prisms remain substantially the same as shown in the previous '021 patent, while the new cube corner prisms between light-turning prisms are configured to accept and retroreflect the incident rays from distant headlights when the traffic stripe is completely under water. In a preferred embodiment of the present invention, the cube corner prisms under the light-turning prisms have an optical axis which is approximately perpendicular to both surfaces of the traffic stripe, while the cube corner prisms between light-turning prisms have an optical axis tilted toward the headlights by about 35.3 degrees from the perpendicular to both surfaces of the traffic stripe.

For present retroreflective traffic stripes used on road surfaces, the best approach to date is to embed glass or ceramic beads in the top surface of the white or yellow paint to achieve a small amount of retroreflection of the illumination of headlights back toward the driver and sensors of the vehicle. These beads are not very effective, especially in wet weather, and are easily broken or dislodged from the top surface of the paint by traffic running over them and by snowplows in colder climates. For present retroreflective traffic stripes used on guardrails and concrete barriers, the best approach to date is to deform the traffic stripes to provide regions which stick outward from the guardrails or concrete barriers to provide a better incidence angle for the headlight beams. These deformed stripes are expensive, and installation is labor-intensive.

What is needed to provide exceptionally bright traffic stripes is a new optical material which can efficiently accept high incidence angle light from approaching headlights, turn this light by about 90 degrees, and send this light on to an array of cube corner retroreflective prisms, which then efficiently reverses the light path and sends the light back to the driver and sensors of the vehicle. The previous invention, described in the '021 patent, and the present invention elegantly fulfill this need for dry road conditions. By combining a top layer of light-turning prisms with a bottom layer of cube corner retroreflective prisms, an extremely efficient, moderate cost new material for traffic stripes has been invented, which could save many lives on the highways of the world. The new traffic stripe offers 1,000 times the retroreflective brightness of conventional traffic stripes under dry conditions.

The present invention described in this application adds excellent retroreflective brightness under wet road conditions. Under extremely wet conditions, the light-turning prisms are no longer optically functional because they are submerged under water which eliminates their capability to turn the incident light rays downward. Fortunately, however, there is space for another large set of cube corner prisms between the widely spaced apart light-turning prisms. The present invention uses a totally different configuration of cube corner prisms between light-turning prisms to provide excellent retroreflectivity for incident rays from distant headlights which are incident at grazing angles onto the water layer above the traffic stripe. These different cube corner prisms are tilted toward the headlights by a substantial angle to enable this unprecedented wet traffic stripe performance. The present invention thereby offers a novel traffic stripe capable of improving retroreflectivity over conventional glass-beaded painted traffic stripes by about 1,000× under dry conditions and by about 10× under submerged conditions. The present invention will thereby save many lives on roadways whether the dark night conditions are clear or stormy. The present invention will work well for vehicles driven by humans or for connected and automated vehicles (CAVs) partially or totally driven by computers using sensors to "see" the traffic stripes which help to guide the vehicle's movement. The present invention will increase the retroreflective brightness for both human drivers and connected and automated vehicles (CAVs) which use sensors to receive the retroreflected rays to provide lane information to guide the vehicle's path.

BRIEF SUMMARY OF THE INVENTION

This invention is a novel retroreflective traffic stripe comprising a widely spaced repeating pattern of linear light-turning prisms over cube corner retroreflective prisms. The light-turning prisms comprise at least two exposed surfaces, one approximately vertical facing the headlights of oncoming traffic, and another opposing the first and sloped by approximately 45 degrees. The approximately vertical surface efficiently accepts light from the headlights and transmits such light to the sloped surface which reflects such light downward using total internal reflection (TIR) whereafter such light intercepts an array of cube corner retroreflective prisms, which together reflect such light back upward in approximately the reverse direction. Such reflected light once more encounters the sloped face of the light-turning prisms which again reflects such light using TIR toward the approximately vertical surface, whereafter such light exits and returns toward the headlights and, more importantly, toward the eyes of the driver and the sensors of the vehicle. The combined effect of the light-turning prisms on the top surface of the traffic stripe and the cube corner prisms on the bottom surface of the traffic stripe provide unprecedented retroreflectivity under dry road conditions.

The invention employs an array of cube corner retroreflective prisms below a widely spaced repeating pattern of light-turning prisms in an optimized configuration to provide a new type of retroreflective traffic stripe, with 1,000× greater brightness than the current state of the art. The invention comprises micro-prismatic polymer sheet made by well-established, high-speed, cost-effective, roll-to-roll embossing processes or other mass-production processes such as injection molding or compression molding. The leading candidate materials for the micro-prismatic sheet are transparent robust polymers such as thermoplastic polyurethane, acrylic, polycarbonate, silicone, fluoropolymer, and combinations thereof.

In the preferred embodiment, the invention requires no metallization of the surfaces of the light-turning prisms or the cube corner prisms, which perform their reflections using the well-known phenomenon of total internal reflection (TIR). TIR is ensured by using polymer materials with refractive indices above 1.4 and by surrounding the outside surfaces of the prisms with air. The candidate materials inherently meet the refractive index requirements (1.50 for thermoplastic polyurethane, 1.49 for acrylic, 1.58 for polycarbonate, 1.41 for silicone, and 1.40 for fluoropolymers such as ETFE).

The invention may be produced in various ways. The light-turning prisms and the cube corner retroreflective prisms may be embossed or molded onto separate individual polymer sheets and laminated together with a transparent adhesive, or they may be embossed or molded on opposite sides of the same sheet of polymer. The latter approach is preferred for high robustness and low cost.

The invention may also use films below the cube corner retroreflective prisms to impede moisture penetration and thereby create a dry air cavity in contact with the cube corner retroreflective prisms, thereby enabling such prisms to perform their reflective function using total internal reflection (TIR) rather than metallic reflection. Alternately, these cube corner retroreflective prisms may be metallized with aluminum or silver or other metal to perform their reflective function using metallic reflection. The TIR approach is preferred for higher retroreflectivity and better full-spectrum appearance.

The invention may use either total internal reflection (TIR) or metallic reflection on the sloped surfaces of the linear light-turning prisms, with TIR the preferred approach.

The invention may use an adhesive layer beneath the other layers to facilitate bonding of the material to the roadway surface. Many types of different adhesives may be used, from liquid or gel adhesives to pressure sensitive adhesives (PSAs).

The invention may be made in roll form to enable machine-aided continuous application of traffic stripes to long sections of highways and roads.

The invention may include a light-turning prism configuration with a third surface connecting the vertical surface and the approximately 45-degree sloped surface of the prism to provide traffic damage mitigation.

The invention may include structural features that protrude above the tops of the light-turning linear prisms to resist the pressure of traffic tires and snowplows and thereby protect and prevent damage to the light-turning prisms.

The invention may be used in a vertical orientation for placement on guardrails or walls next to the highway.

The invention may be used with light-turning prismatic features facing opposite directions to be visible from vehicles traveling in both directions.

The invention may include a white back film to provide daytime brightness for the traffic stripe under sunlight illumination.

The invention may include colored pigment in the prismatic polymer material, such as yellow, red, or other colors to impart color to the retroreflected rays from headlights at night, or to the reflected rays from sunlight during the day.

Under very wet road conditions, water may cover the light-turning prisms which will then not perform their optical function. Fortunately, the inventor has discovered a novel solution to this wet road retroreflectivity problem. Since the light-turning prisms are widely space apart along the length of the traffic stripe, there is ample space for a large number of different cube corner prisms between these widely space light-turning prisms. If these cube different corner prisms between light-turning prisms are substantially tilted toward the oncoming headlights, they can provide a significant retroreflectivity even when the traffic stripe is completely submerged under rainwater runoff. Under dry conditions these cube corner prisms between light-turning prisms provide no optical function. Only the cube corner prisms beneath the light-turning prisms are functional under dry conditions and these cube corner prisms are not substantially tilted. The present invention uses a novel configuration comprising a different type of cube corner prisms beneath the light-turning prisms than between the light-turning prisms, with the former providing dry retroreflectivity and the latter providing wet retroreflectivity. Specifically, the cube corner prisms beneath the light-turning prisms will have their optical axes approximately perpendicular to the surfaces of the traffic stripe, while the cube corner prisms between the light-turning prisms will have their optical axes tilted off perpendicular toward the headlights by a significant amount such as 35.26 degrees. By using both types of cube corners in the same traffic stripe, the retroreflectivity will be about 1,000× brighter than conventional traffic stripes under dry conditions, and about 10× brighter than conventional traffic stripes under submerged conditions.

The widely space light-turning prisms comprise about 10-15% of the running length of the traffic stripe in both the '021 patent invention and the present invention. This leaves about 85-90% of the running length of the traffic stripe non-functional in the '021 patent invention, but functional under submerged conditions in the present invention. Thus, without adding any cost to the traffic stripe of the '021 patent, high wet retroreflectivity can be accomplished by the present invention just by changing the geometry of the cube corner prisms between light-turning prisms. By making use of this previously wasted portion of the traffic stripe in the invention described in the '021 patent, high submerged retroreflectivity is accomplished by the present invention.

BRIEF DESCRIPTION OF THE DRAWINGS

For all of the figures, the numerals shown in the drawings identify these key elements of the invention:
1. Traffic Stripe Lengthwise Region Under Repeating Light-Turning Prismatic Pattern on Top of Traffic stripe
2. Traffic Stripe Lengthwise Region Between Repeating Light-Turning Prismatic Pattern on Top of Traffic stripe
3. Light-Turning Prismatic Pattern on Top of Traffic Stripe
4. Cube Corner Prisms on Bottom of Traffic Stripe
5. Cube Corner Prisms Under Light-Turning Prismatic Patterns (Region 1)
6. Cube Corner Prisms Between Light-Turning Prismatic Patterns (Region 2)
7. Installation of New Traffic Stripe on Highway
8. Groove Cut into Pavement
9. Pavement
10. White Adhesive Beneath Traffic Stripe
11. Light-Turning Prism
12. Incident Rays from Distant Headlights and Retroreflected Rays Following the Reverse Path
13. Structural Bar to Protect Light-Turning Prisms from Traffic Damage
14. White Film Welded to Cube Corner Prisms to Create Air Pockets for Total Internal Reflection (TIR)
15. Water Level over Submerged Traffic Stripe
16. Refracted Rays in Water
17. Refracted Rays in Polymer
18. Cube Corner Geometry Formed by Diagonally Slicing a Cube in Half
19. Optical Axis of Cube Corner Making Same Angle with Three Sides
20. "Dead Areas" Where Retroreflection Fails Near Corners of Triangular Aperture
21. Rectangular Aperture Used in 100% Effective "Full Cube" Cube Corners
22. Discarded Portions of Cube Corner to Leave "Full Cube" Configuration
23. Retained Portion of Cube Corner Forming "Full Cube" Cube Corner with Rectangular Aperture
24. Rotated "Full Cube" Cube Corner Used to Form Pairs of "Full Cube" Cube Corners
25. Air Gaps Needed at Ends of Cube Corner Prisms Between Light-Turning Prismatic Patterns
FIG. 1-A shows a side view of a section of the traffic stripe which employs the light-turning prismatic structure described in '021 patent on its top surface and cube corner retroreflective prisms on its bottom surface. The unique features of the present invention include the definition of two lengthwise regions along the length of the traffic stripe. The first Region 1 is the region which contains the repeating light-turning prismatic pattern 3 plus a little extra length on both ends. The second Region 2 is the region between the repeating light-turning prismatic patterns 3. Regions 1 and 2 repeat over the full length of the traffic stripe. The combined length of Regions 1 and 2 is the spacing between repeating light-turning prismatic patterns 3.

The cube corner prisms 4 on the bottom of the traffic stripe are constructed quite differently for the two regions. For Region 1, the cube corner prisms 5 are optimized to accept and retroreflect rays of light which arrive and leave the cube corner prisms in a direction of travel which is substantially perpendicular to both surfaces of the traffic stripe. For Region 2, the cube corner prisms 6 are optimized to accept and retroreflect rays of light which arrive and leave the cube corner prisms at a substantial angle relative to the perpendicular to both surfaces of the traffic stripe. For the example rays shown in FIG. 1, this angle is about 41.8 degrees off perpendicular.

Figure 1:
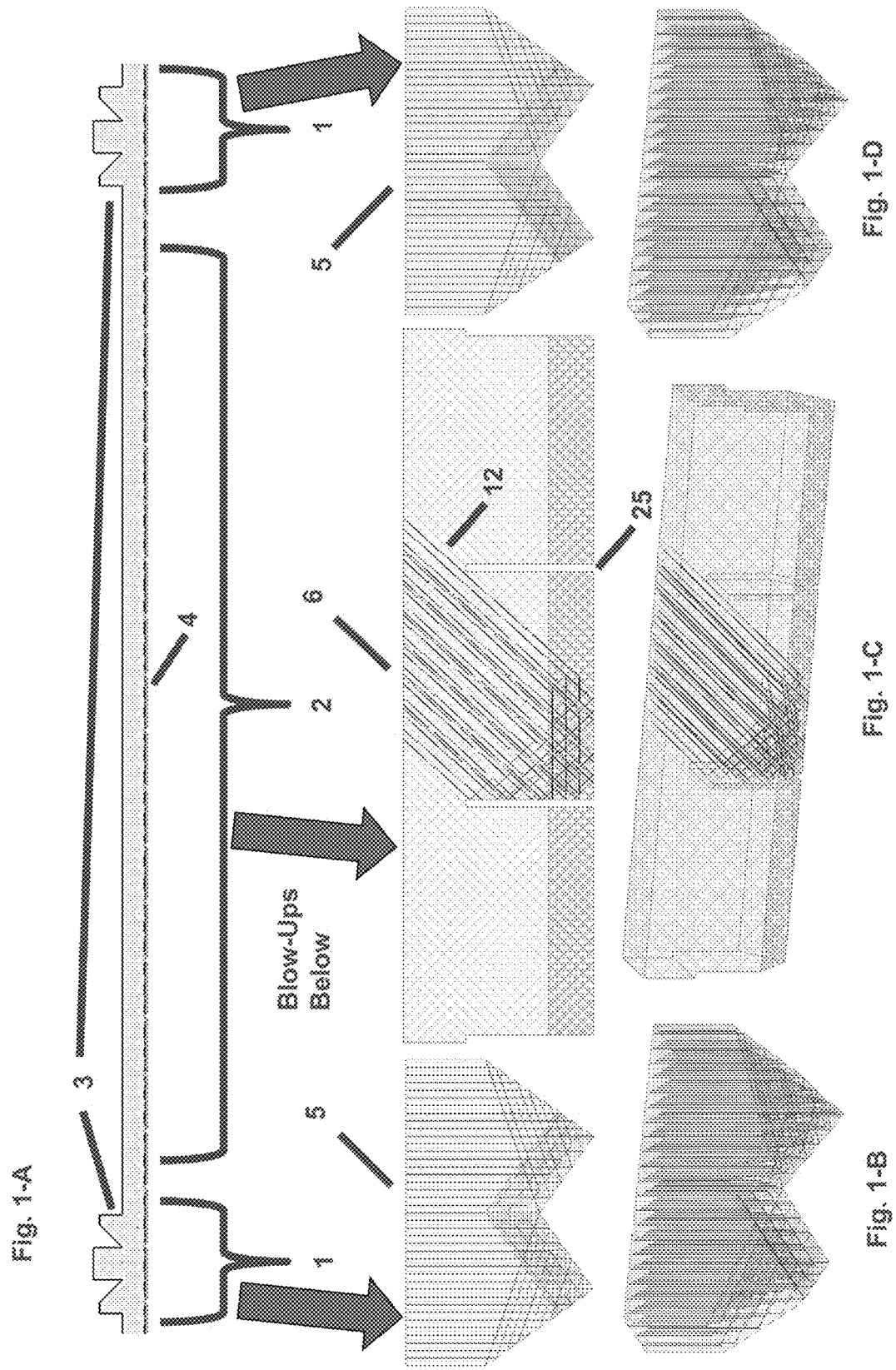
FIG. 1 shows the key elements of the present invention in multiple views.

FIG. 1-B shows a blow-up of the cube corner prisms 5 and rays 12 travelling in both directions along a path substantially perpendicular to the surfaces of the traffic stripe. FIG. 1-C shows a blow-up of the cube corner prisms 6 and rays 12 travelling in both directions along a 41.8-degree path off vertical. The differences in configuration of cube corner prisms 5 and 6 are obvious. In terms which one of ordinary skill in the art will easily understand, the optical axis of each of the cube corner prisms 5 is substantially perpendicular to the surfaces of the traffic stripe compared to the optical axis of each of the cube corner prisms 6 which is tilted by about 35.26 degrees off the perpendicular to the surfaces of the traffic stripe for the example configuration shown in FIG. 1. Note that an air gap 25 is required at each end of each individual prismatic element 6 to insure total internal reflection (TIR).

FIG. 1-D shows that the cube corner prisms 5 under each repeating pattern of light-turning prisms 3 are identical to those shown in FIG. 1-B. FIGS. 1-B, 1-C, and 1-D show two blow-up views each of the prisms 5, 6, and 5, respectively, one view being the side view and the other being an isometric view. As will be shown in the following paragraphs, prisms 5 provide unprecedented dry performance for the new traffic stripe and prisms 6 provide unprecedented wet performance for the new traffic stripe.

FIG. 1 summarizes the major improvement of the present invention over the invention described in detail in the '021 patent. A different type of cube corner prism 6 is used in Region 2 for the present invention to provide unprecedented performance when the new traffic stripe is underwater, an important feature not yet discovered in the '021 patent. The features 3 and 5 providing unprecedented performance under dry conditions are retained from the '021 patent.

Figure 2:
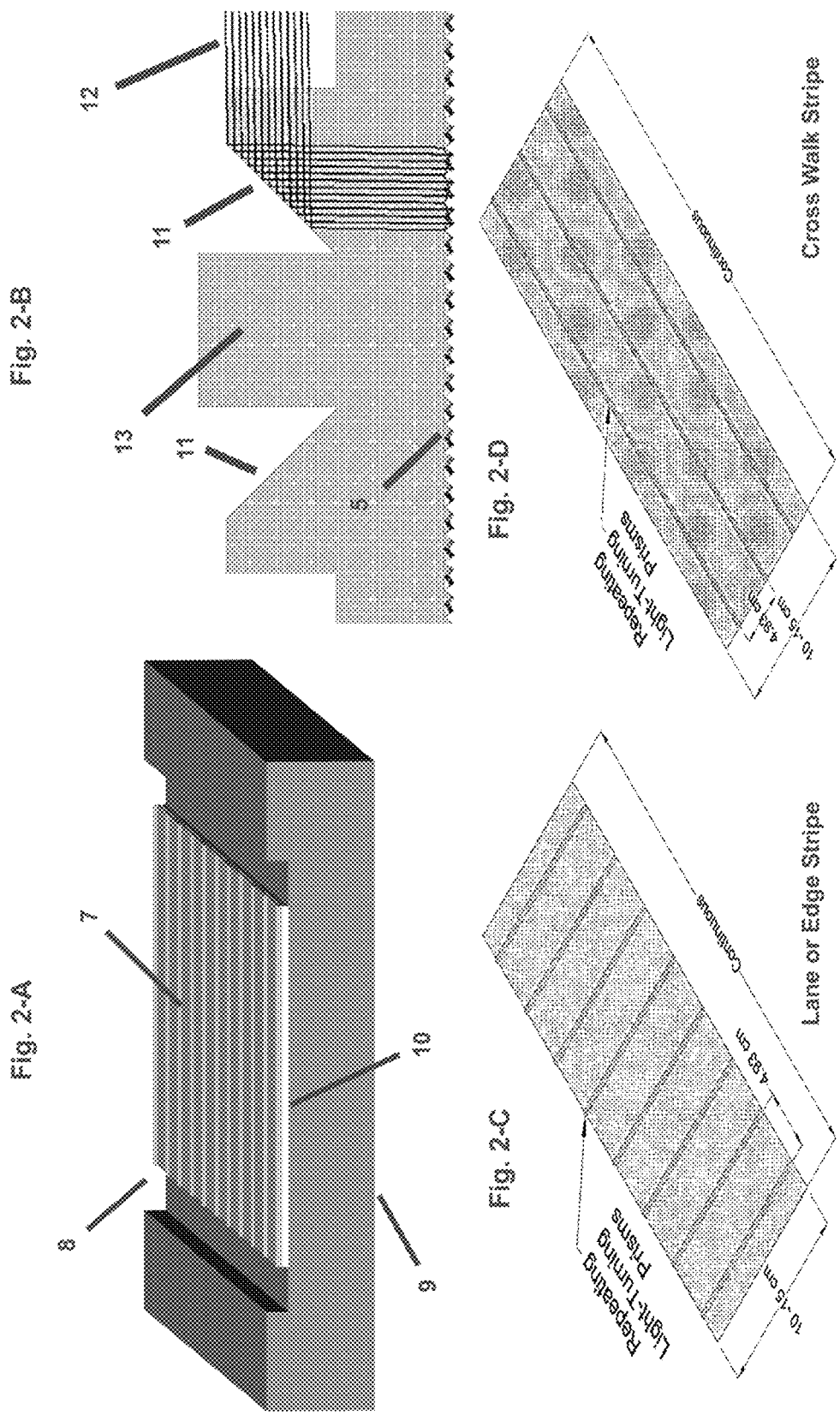

FIG. 2 shows in multiple views the currently preferred embodiment of the ultra-bright traffic stripe described in the '021 patent. All of these features are retained in the present invention which adds an important new configuration for wet road conditions. FIG. 2-A shows the currently preferred method of installing the traffic stripe 7 on highways. A groove 8 is cut into the pavement 9 using available equipment widely employed for conventional traffic stripes in locations where snowplow damage is likely. The traffic stripe 7 is bonded to the bottom of groove 8 using a white-colored adhesive 10. The white color is preferred in the event that part of the traffic stripe 7 becomes dislodged from the roadway, since the white color will provide some level of visibility until repair or replacement of the missing part of the traffic stripe 7.

FIG. 2-B shows a cross-sectional view of the light-turning prisms 11 which redirect incident rays 12 from distant headlights onto cube corner retroreflective prisms 5 on the bottom surface of the traffic stripe. Retroreflected rays 12 follow the same path in reverse as the incident rays 12 back to the driver and sensors of the vehicle whose headlights provided the incident illumination. To protect the light-turning prisms from traffic damage, a structural element 13 protrudes above light-turning prisms 11 to absorb the impact from vehicle tires.

FIG. 2-C shows the pattern of repeating light-turning prisms 11 on a lane or edge stripe which runs parallel to the roadway. FIG. 2-D shows the pattern of repeating light-turning prisms 11 on a cross walk stripe or intersection stripe which runs perpendicular to the roadway.

FIG. 3 shows another essential feature of the traffic stripe described in the '021 patent, which is also incorporated in the present invention, a white film 14 welded to the bottom surface of the traffic stripe using ultrasonic techniques widely used for retroreflective sheeting for road signs. This white film provides small air pockets surrounding the cube corner prisms 4 to enable total internal reflection (TIR) to occur. FIG. 3-A shows a side view of a section of traffic stripe including two sets of light-turning prisms 3. FIG. 3-B shows a blow-up of the region of traffic stripe containing the light-turning prisms 11 and the protective structural element 13. FIG. 3-C shows a further blow-up of the white film 14 and cube corner prisms 4. White is the preferred color of the film 14 to provide daytime brightness of the traffic stripe under sunlight illumination.

FIG. 4 shows multiple three-dimensional isometric views of the light-turning prisms 11 and cube corner prisms 4 interacting with incident and retroreflected rays 12 to accomplish the high optical performance of the traffic stripe described in the '021 patent and incorporated in the present invention. FIG. 4-A shows a transparent isometric view with incident and retroreflected rays 12. FIG. 4-B shows an opaque isometric view without the rays, highlighting the three-dimensional shapes of the light-turning prisms 11 and the taller structural element 13 which provides protection for the light-turning prisms 11. FIG. 4-C shows another transparent isometric view from below the traffic stripe. FIG. 4-D shows another opaque isometric view from below the traffic stripe without the rays, highlighting the cube corner retroreflective prisms 4 on the bottom surface of the traffic stripe.

Figure 5:
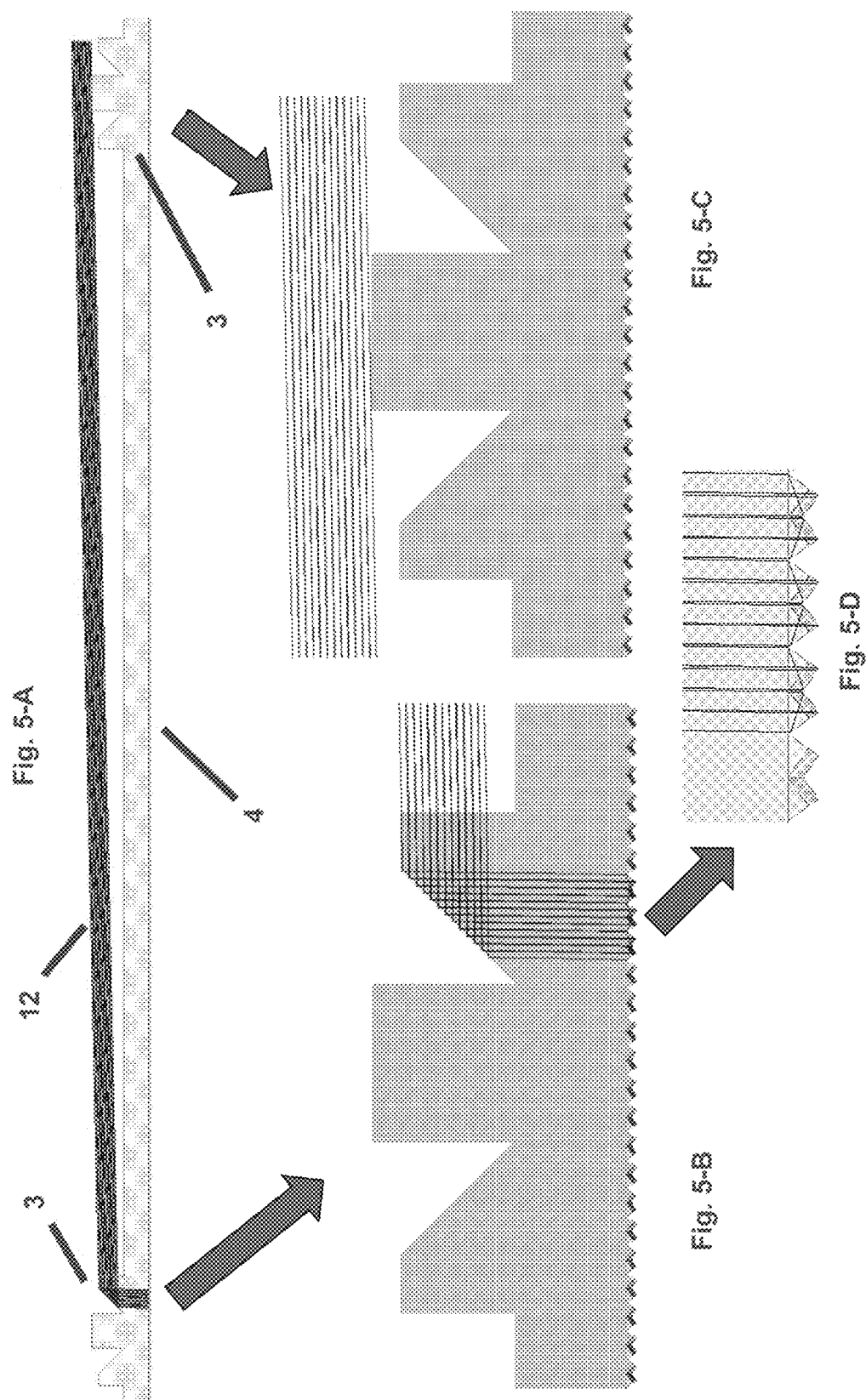

FIG. 5 shows a set of side views of the traffic stripe as described in the '021 patent and as incorporated into the present invention to provide extremely high retroreflectivity under dry road conditions. FIG. 5-A shows a section of the traffic stripe containing two of the repeating patterns 3 of the light-turning prisms. The wide spacing between repeating light-turning prismatic patterns 3 allows incident and retroreflected rays 12 to avoid ray blockage by one pattern of light-turning prisms 3 while such rays are proceeding the next pattern of light-turning prisms 3. The cube corner prisms 4 are shown on the bottom surface of the traffic stripe.

FIG. 5-B shows a blow-up view of the left-most pattern of light-turning prisms 3 from FIG. 5-A, including incident and retroreflected rays 12. FIG. 5-C shows a blow-up view of the right-most pattern of light-turning prisms 3 from FIG. 5-A, including incident and retroreflected rays 12 which pass over the top of this right-most pattern of light-turning prisms 3 from FIG. 5-A. FIG. 5-D is a further blow-up view of the cube corner retroreflective prisms which accept and return rays along paths that are substantially perpendicular to the surfaces of the traffic stripe.

Figure 6:
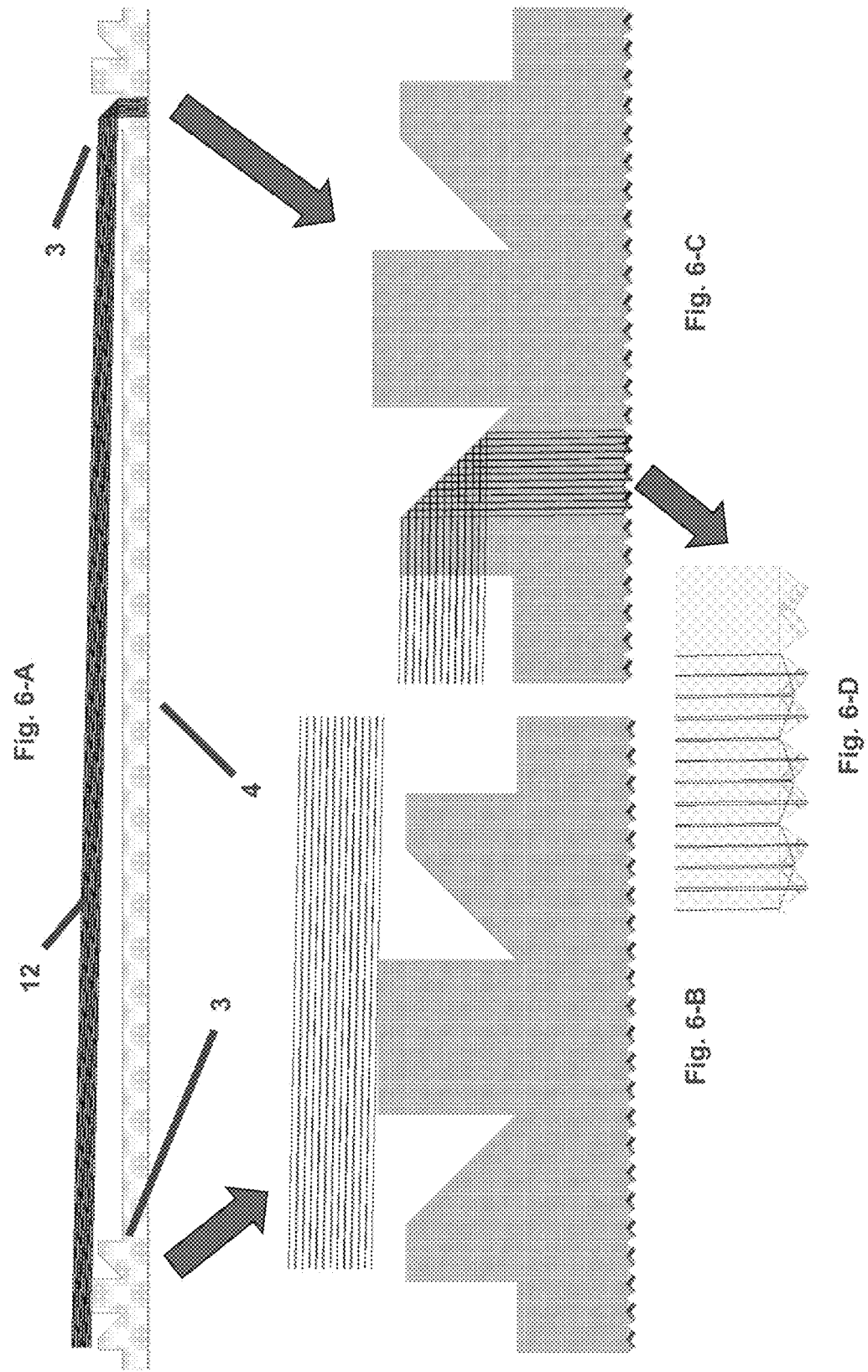

FIG. 6 shows the same views as FIG. 5 but with the incident and retroreflected rays coming from the left side of the views rather than from the right side of the views as in FIG. 5. FIG. 6-A shows the repeating pattern of light-turning prisms 3 on the top surface of the traffic stripe. FIG. 6-A also shows the incident and retroreflected rays 12 and the cube corner retroreflective prisms 4. FIG. 6-B shows a blow-up of the left-most pattern of light-turning prisms 3 from FIG. 6-A. FIG. 6-C shows a blow-up of the right-most pattern of light-turning prisms 3 from FIG. 6-A. FIG. 6-D shows a further blow-up of the cube corner retroreflective prisms on the bottom surface of the traffic stripe.

FIGS. 4, 5, and 6 show the optical functionality of the traffic stripe of the '021 patent and of the present invention under dry road conditions. Unprecedented retroreflective performance is achieved by the traffic stripe under dry conditions.

Figure 7:
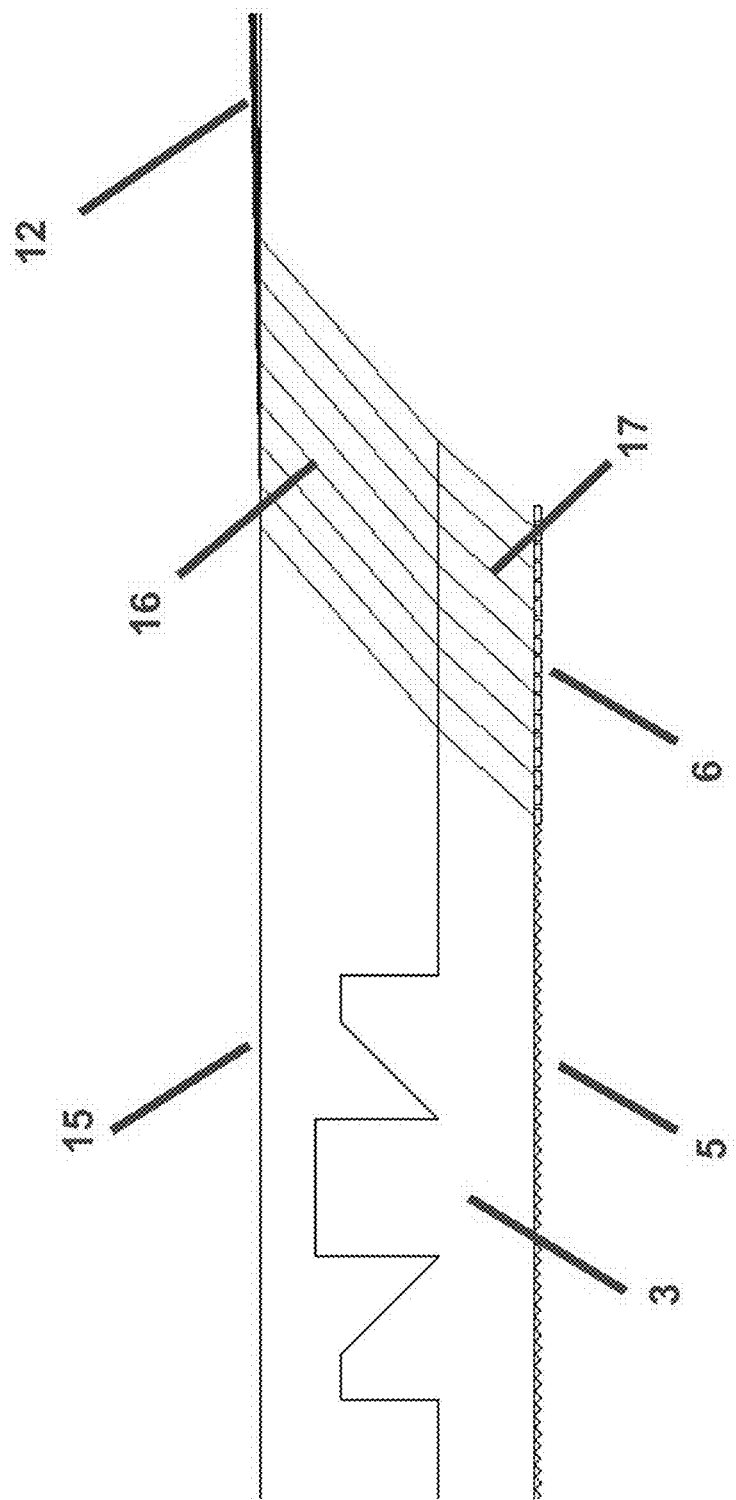

FIG. 7 shows the new and important optical functionality of the present invention under wet, submerged conditions. The water level 15 is higher than the pattern of light-turning prisms 3, thereby rendering these light-turning prisms 3 non-functional optically. The cube corner prisms 5 which function optically so well under dry conditions no longer function optically under submerged conditions because no rays are incident onto such cube corner prisms 5 in a direction nearly perpendicular to the surfaces of the traffic stripe. Fortunately, the present invention also comprises a second set of different cube corner prisms 6 in the space between repeating patterns of light-turning prisms 3. These different cube corner prisms 6 are configured to efficiently accept and retroreflect rays 17 inside the polymer material comprising the traffic stripe. Rays 17 become rays 16 in the water layer above the polymer at a slightly different angle due to the refraction of rays at the polymer-water interface. Rays 16 become rays 12 in the air above the water layer at a significantly different angle due to refraction of rays at the water-air interface. All three sets of rays 12, 16, and 17 represent both incident and retroreflected rays which follow the same paths in reverse. The difference between cube corner prisms 5 and cube corner prisms 6 is substantial, with the former configured to accept and retroreflect rays which are approximately perpendicular to the surfaces of the traffic stripe, with the latter configured to accept and retroreflect rays which are substantially inclined from the perpendicular to the surfaces of the traffic stripe. For example, in FIG. 6 the rays 17 inside the polymer are inclined at approximately 42 degrees from the perpendicular to the surfaces of the traffic stripe.

Figure 8:
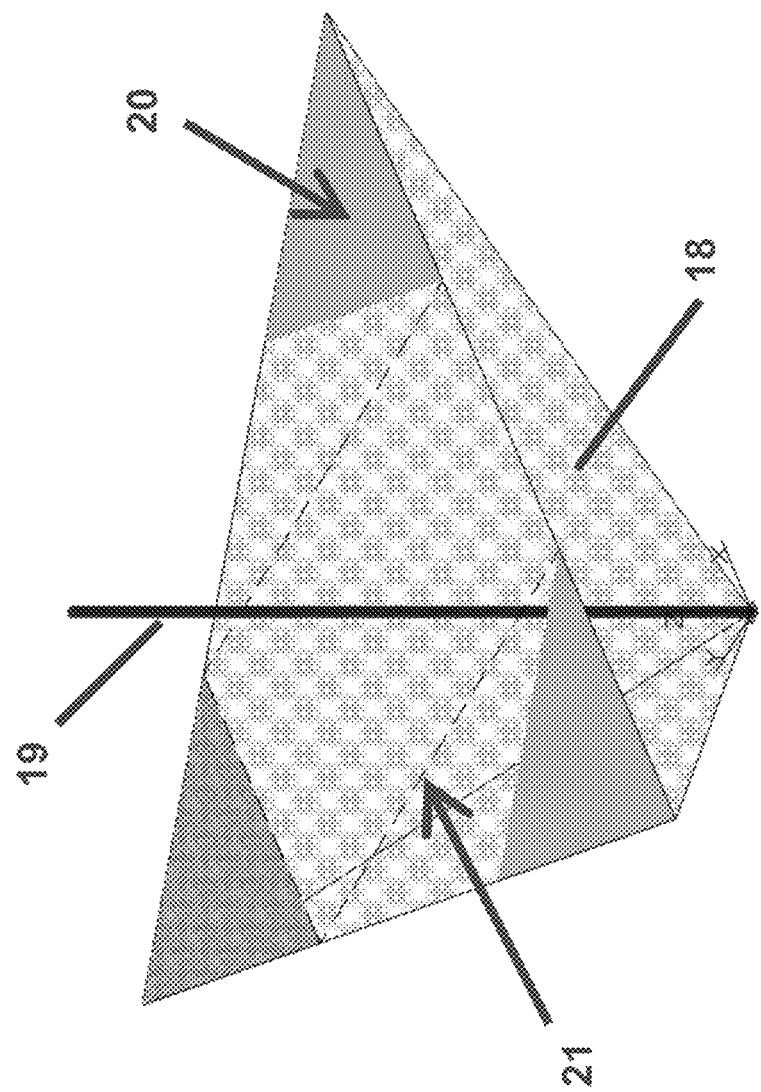

FIG. 8 shows the design progression from a complete cube corner prism 18, corresponding to one corner sliced diagonally from a complete cube, to what is known by those skilled in the art of retroreflective sheeting for road signs as a "full cube" cube corner prism. The complete cube corner prism 18 has a triangular aperture corresponding to the slicing plane which created the complete cube corner prism 18 from a complete cube. The optical axis 19 of a cube corner prism is positioned at the same angle from each of the three mutually perpendicular sides forming the cube corner and is perpendicular to the triangular aperture at the centerline of the triangular aperture. When illuminated by light rays parallel to the optical axis 19 and perpendicular to the triangular aperture, full retroreflection is accomplished only by three sequential reflections from each of the three sides forming the cube corner. If only one or two reflections occur, full retroreflection is not achieved and the reflected ray goes elsewhere rather than returning to the source of the incident ray, as is well known by those of ordinary skill in the art of retroreflection. This lack of retroreflection occurs in the three triangular gray areas 20 in FIG. 8. These are called "dead areas" in the literature of cube corner optics. It has been known for decades that these "dead areas" 20 can be eliminated from a smaller cube corner obtained by slicing away the "dead areas" and leaving only 100% effective retroreflective regions of the cube corner. The most widely used approach for slicing away the "dead areas" is shown by the rectangular dashed Region 21.

Figure 9:
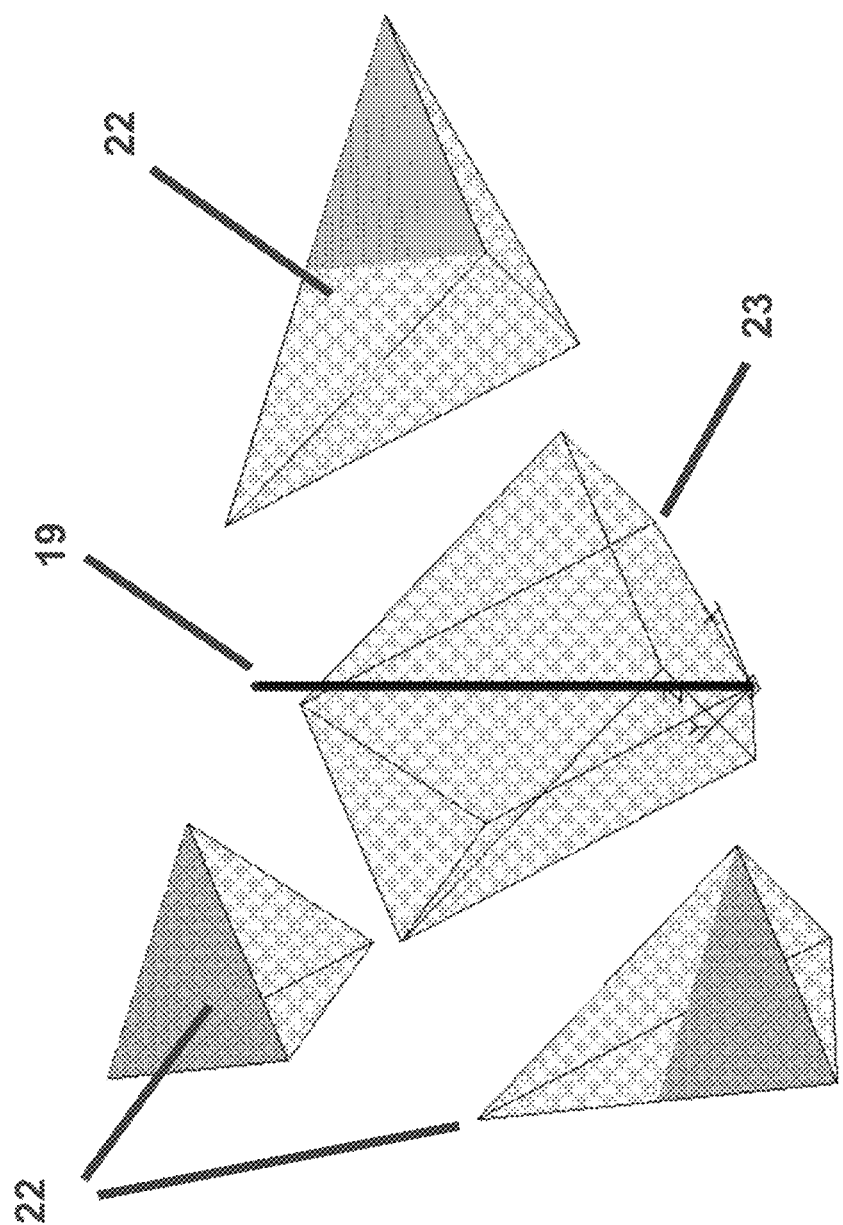

FIG. 9 shows how the "dead areas" 22 can be sliced away from the complete cube corner to leave a 100% retroreflective cube corner 23. This remaining cube corner 23 is widely known in the literature of cube corner retroreflective sheeting as a "full cube" cube corner prism, although a possibly better name might be "fully effective cube corner prism."

Figure 10:
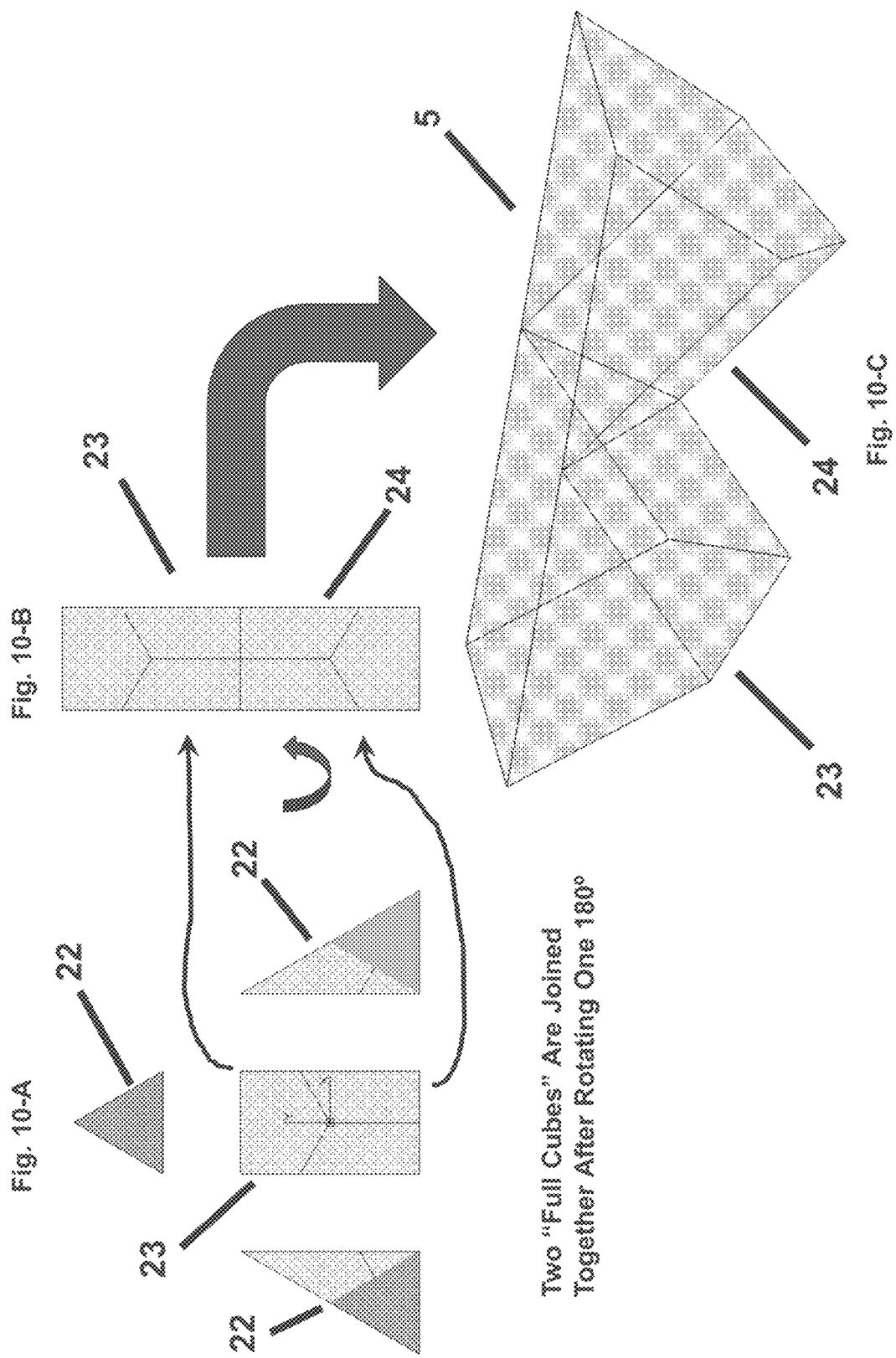

FIG. 10 shows how two "full cube" cube corner prisms 23 may be joined together in a pair 5 after rotating one of the prisms 23 by 180 degrees to form "full cube" cube corner prism 24. When cube corner prisms 23 and 24 are joined together, they form the preferred cube corner prism pair geometry 5 used beneath the light-turning prisms. The optical axes of cube corners 23 and 24 and therefore of cube corner pair 5 are approximately perpendicular to the surfaces of the traffic stripe, as previously shown in FIGS. 1-B and 1-D. This is the preferred cube corner geometry 5 for Region 1 of FIG. 1-A. FIG. 10-A shows the top view of the four sliced pieces of the complete cube corner 18 shown in FIGS. 8 and 9. FIG. 10-B shows how "full cube" 23 and rotated "full cube" 24 can be joined together to form cube corner pair 5. FIG. 10-C shows an isometric view of cube corner pair 5.

Figure 11:
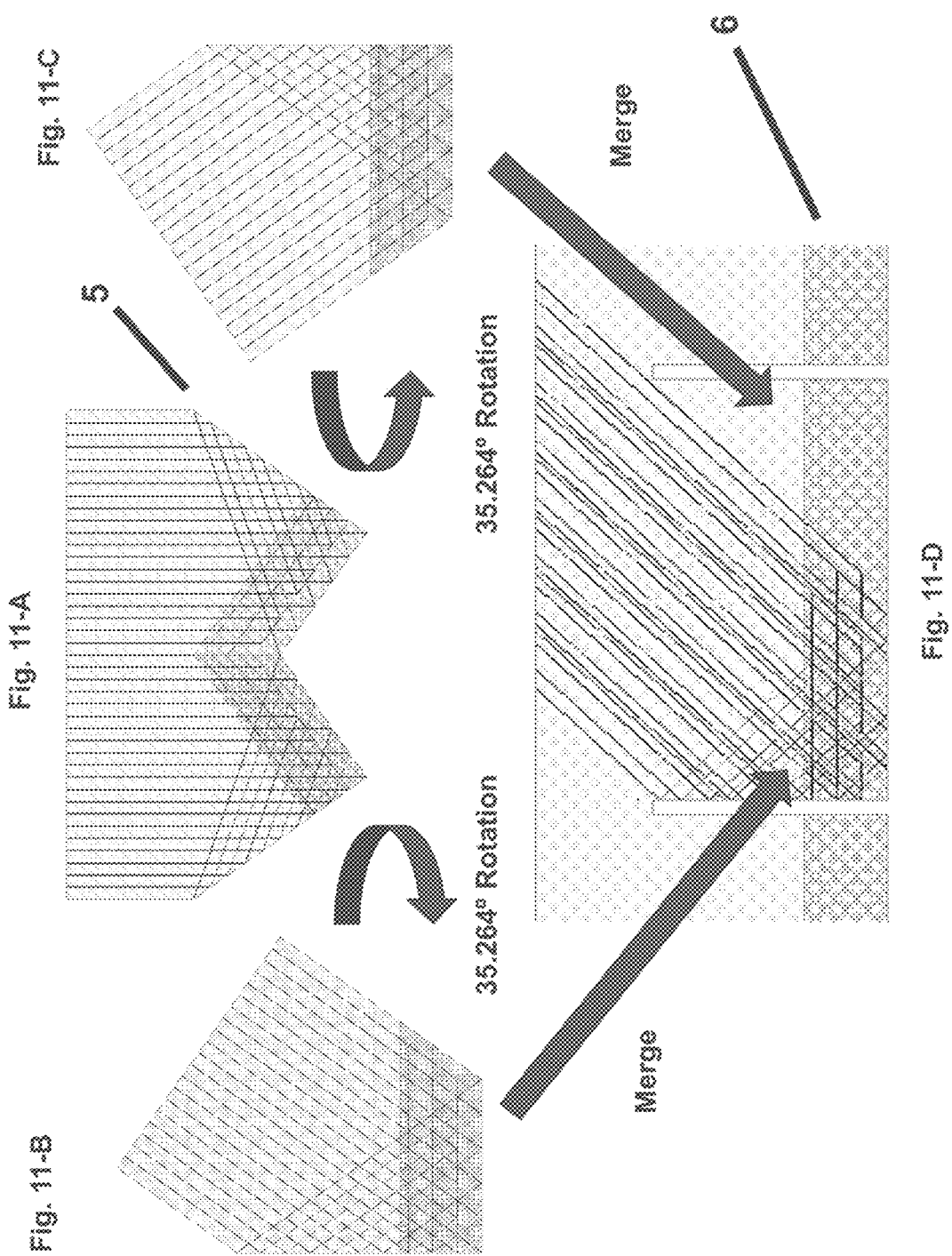

FIG. 11 shows the geometric relationship between cube corner prisms 5 which are used in Region 1 and cube corner prisms 6 which are used in Region 2 of FIG. 1 in the present invention. FIG. 11-A shows the preferred geometry 5 of a pair of cube corner prisms for Region 1. If the left half of this pair is rotated in one direction by about 35.3 degrees, as shown in FIG. 11-B, and the right half of this pair is rotated in the opposite direction by about 35.3 degrees, as shown in FIG. 11-C, these two halves can be merged to form the cube corner prismatic geometry shown in FIG. 11-D. The rotation angle of 35.3 degrees causes one face of each cube corner to be vertical while the remaining two faces of each corner join together along a horizontal line. In effect, the two cube corner prisms join together to form a linear prism running horizontally from left to right in FIG. 11-D. This linear prism has two faces which are mutually perpendicular to each other and also to the vertical faces on the ends of the linear prism. To enable total internal reflection (TIR) from the vertical ends, an air gap is needed at each end. A repeating pattern of these rotated cube corner prisms with air gaps between the repeating prisms represents the preferred cube corner prismatic geometry 6 for Region 2 of FIG. 1. The optical axis of each cube corner prism 6 is tilted by about 35.3 degrees off the perpendicular to the surfaces of the traffic stripe.

Figure 12:
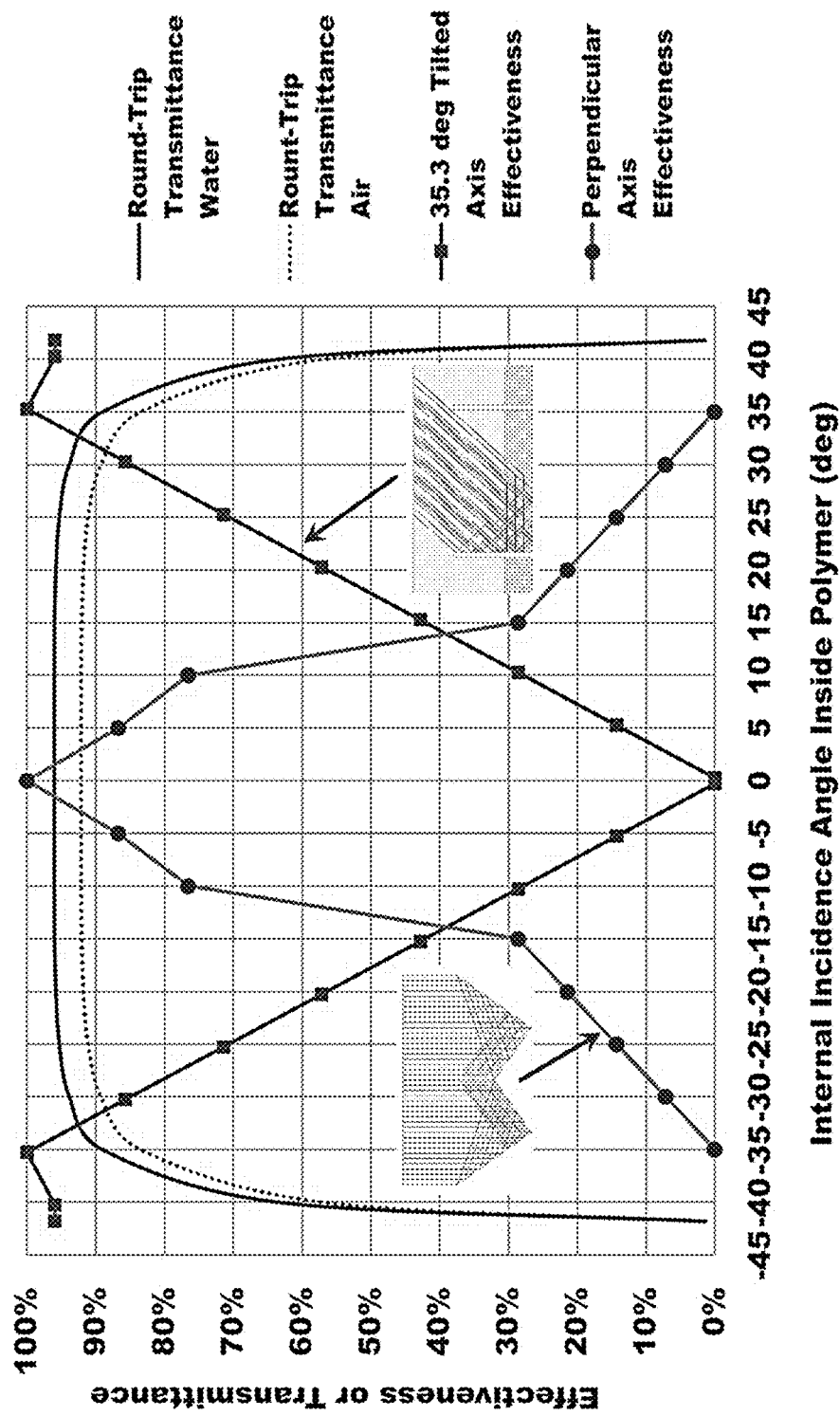

FIG. 12 presents the results of optical analyses by the inventor showing the effectiveness of both types of cube corner prisms 5 and 6. By effectiveness, the inventor means the fraction of incident rays which are retroreflected after three total internal reflections (TIRs) back in the reverse direction of the incident rays. It should be noted that 100% effectiveness occurs for both types of cube corner prisms when the internal incidence angle of rays inside the polymer equals the tilt angle of the optical axis of the cube corner prism. It should also be noted that the effectiveness drops off rapidly for both types of cube corner prisms when the internal incidence angle varies by more than 10 degrees from the tilt angle of the optical axis of the prism. There are two principal reasons for the rapid falloff in effectiveness when the internal incidence angle varies from the cube corner prism tilt angle:

1. The incident rays do not undergo all three reflections from all three faces of the cube corner prism, or
2. The rays undergoing reflection at the three faces of the cube corner prism do not achieve total internal reflection (TIR) at all three faces due to a local incidence angle smaller than the required critical angle for TIR.

FIG. 12 also shows the round-trip transmittance for incident and retroreflected rays for either the dry polymer top surface with air above or for a liquid water top surface with air above as a function of internal incidence angle inside the polymer. Due to the lower refractive index of 1.33 for water compared to 1.50 for the polymer (assumed to be thermoplastic polyurethane), the round-trip transmittance is higher for the wet condition. The round-trip transmittance is the transmittance of incident rays times the transmittance of retroreflected rays at the top surface. Each of these transmittance values is readily calculated from the well-known Fresnel equations by one of ordinary skill in the art of optics.

Figure 13:
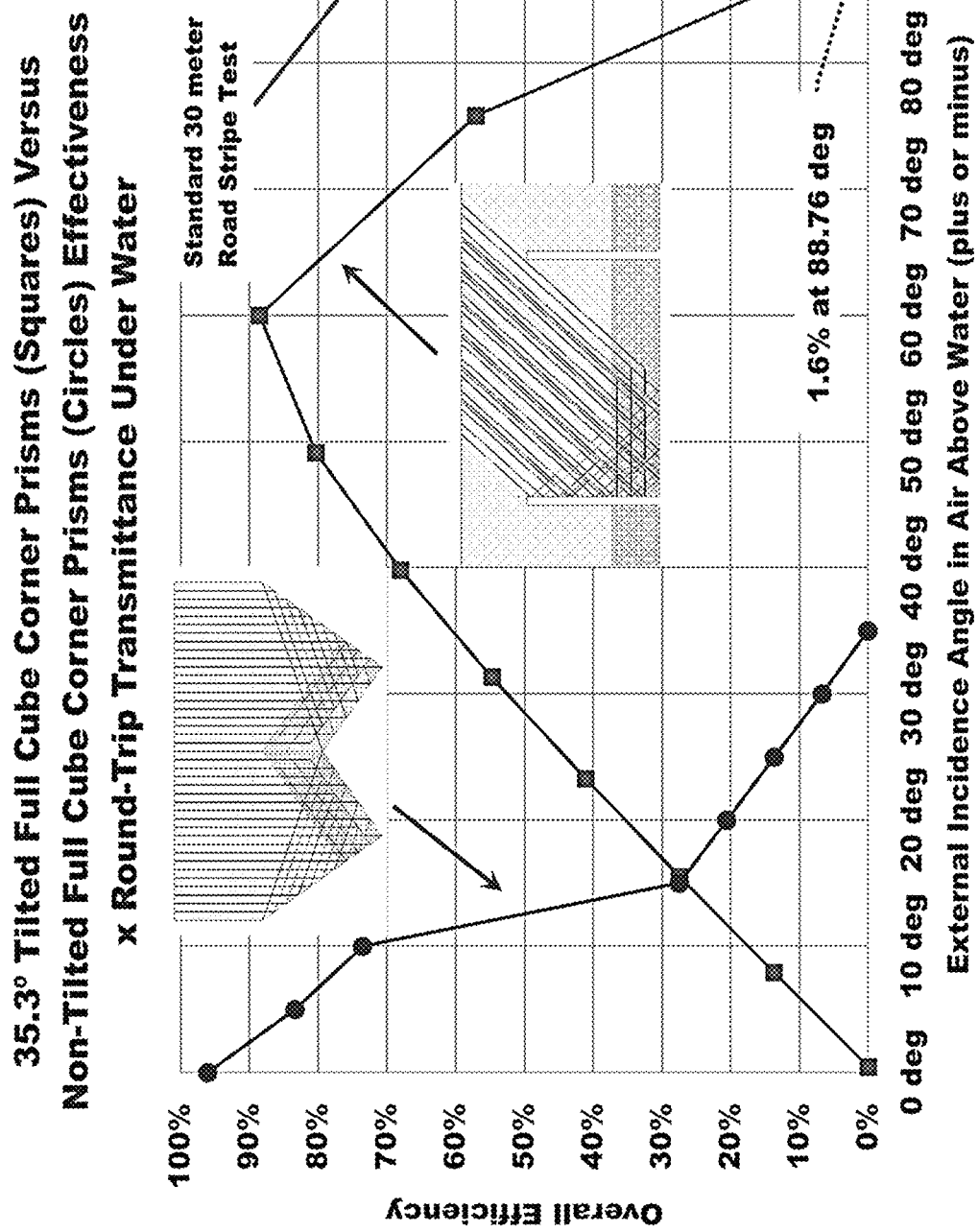

FIG. 13 shows the combined results of effectiveness times round-trip transmittance under water from FIG. 12 plotted as a function of external incidence angle in the air above the water. The peak overall efficiency is about 96% at about 0 degrees external incidence angle for the prisms with an optical axis perpendicular to the surfaces of the traffic stripe. The peak overall efficiency is about 89% at about 60 degrees external incidence angle for the prisms with a 35.3 degree tilted optical axis with the tilt toward the headlights relative to a perpendicular to the surfaces of the traffic stripe.

FIG. 13 also shows the overall efficiency at the critical external incidence angle of 88.76 degrees. This external incidence angle corresponds to the standard illumination test condition for traffic stripe retroreflectivity corresponding to headlights 30 meters away with the headlights 0.65 meter above the road surface. The arctangent of 0.65/30 is 1.24 degrees, and the complementary angle of incidence is 90 degrees−1.24 degrees=88.76 degrees. In the U.S., this standard test is specified in ASTM E 1710. It should be noted that the overall efficiency of the tilted cube corner is about 1.6% for this standard test condition. While this overall efficiency may seem small, it is still large enough to provide an unprecedented level of retroreflectivity for a fully submerged traffic stripe.

It should be noted that the standard test for traffic stripes measures the retroreflected light at the assumed position of the driver of the vehicle with the headlights illuminating the traffic stripe. This assumed position is 1.2 meters above the roadway. Due to physical effects and practical imperfections in traffic stripes, the retroreflected light is always dispersed into a small cone of rays rather than proceeding back perfectly to the headlights as one of ordinary skill in the art of retroreflective sheeting fully understands. This dispersion allows the driver to see the retroreflected light at the driver's small angular offset position of about 1 degree away from the center of the retroreflected cone. The cone of dispersion also allows sensors on connected and automated vehicles (CAVs) to detect the retroreflected light. The cone of dispersion can also be further increased by intentionally tweaking one of the three cube corner faces to be slightly offset angularly from perfect orthogonality with the other two faces as is well known in the field of retroreflective road sign sheeting.

Figure 14:
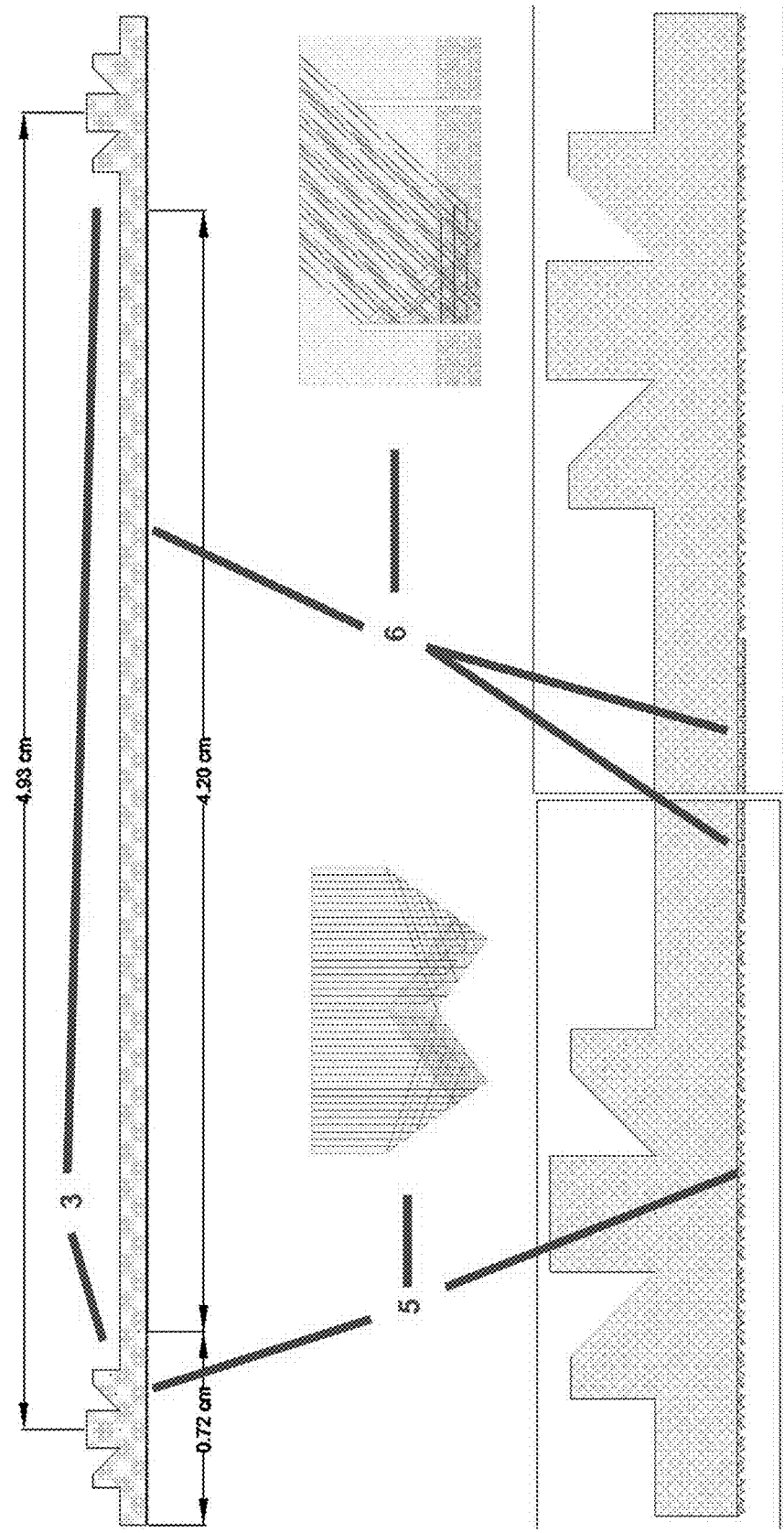

FIG. 14 shows the currently preferred embodiment of the present invention including key dimensions. FIG. 14-A shows a side view of a section of the new traffic stripe with two of the repeating patterns of light-turning prisms 3 spaced apart by about 4.93 cm in the direction along the traffic stripe. FIG. 14-B shows a blow-up view of the left-side pattern of light-turning prisms 3 and FIG. 14-C shows a blow-up view of the right-side pattern of light-turning prisms. The two different types of cube corner retroreflective prisms are also highlighted in FIGS. 14-A, 14-B, and 14-C. Specifically, cube corner prisms 5 with optical axes perpendicular to the surfaces of the traffic stripe are shown to be located beneath each light-turning prismatic pattern 3 and extend beyond the length of the light-turning pattern 3 on both ends to provide a large misalignment tolerance between the light-turning prismatic pattern 3 and the cube corner pattern 5. Each of these cube corner prisms 5 is configured to work with the light-turning prismatic patterns 3 to provide excellent retroreflective performance under dry road conditions.

FIG. 14-C shows cube corner prisms 6 which are located between repeating light-turning prismatic patterns 3. Each of these cube corner prisms 6 has an optical axis tilted by about ±35.3 degrees to provide acceptable retroreflective performance under wet conditions with the traffic stripe submerged beneath a layer of water.

Figure 15:
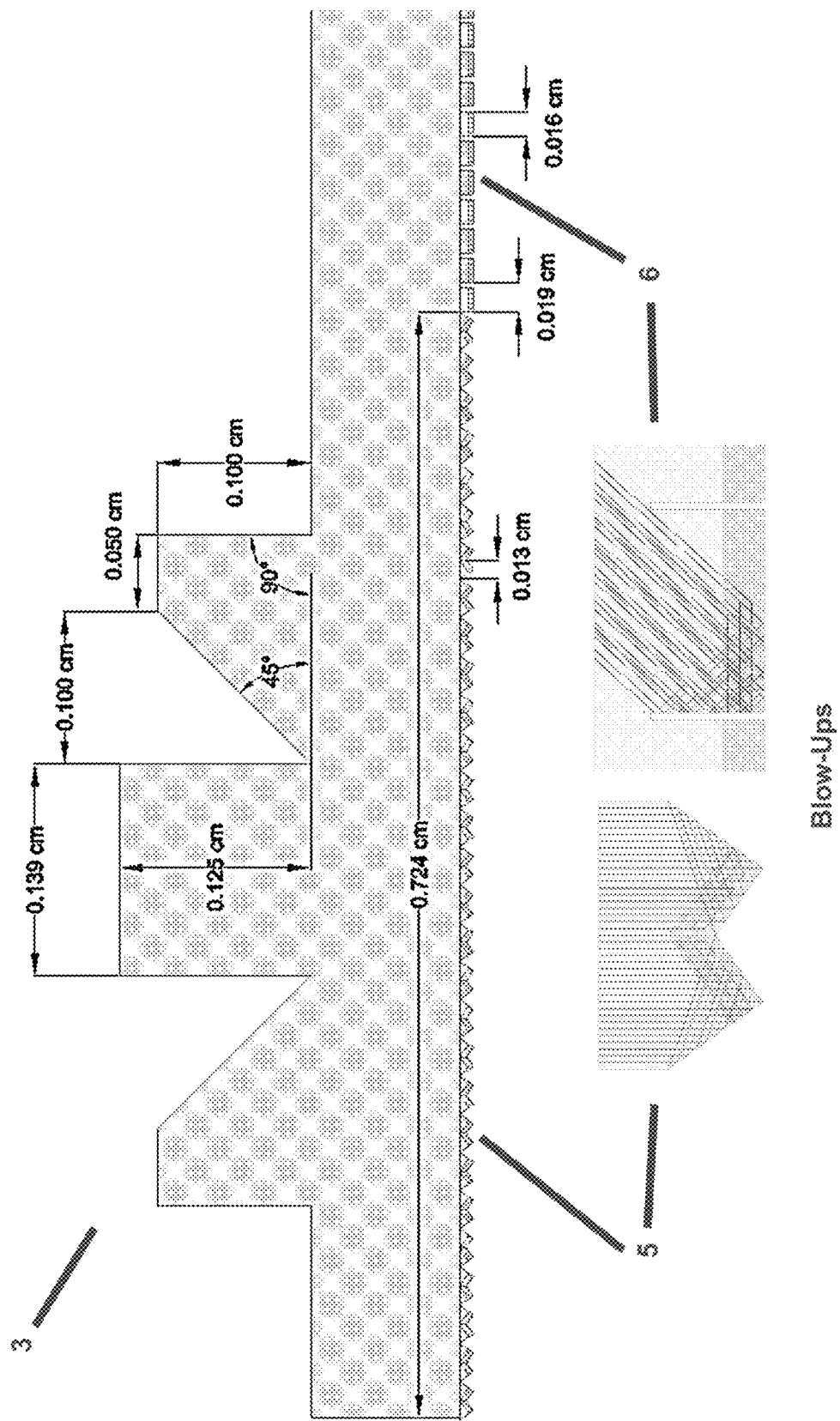

FIG. 15 provides an enlarged view with more details of the dimensions of the repeating light-turning prismatic pattern 3 in the presently preferred embodiment of the present invention. FIG. 15 also includes blow-up views of the two types of cube corner prisms 5 and 6 which are located beneath and between light-turning prismatic patterns 3, respectively. The overall thickness of the traffic stripe is not specified in FIG. 15 but is expected to be in the range of 1.5-2.0 mm depending on the manufacturing method. The overall thickness is not critical to the optical functionality of the novel traffic stripe.

DETAILED DESCRIPTION AND BEST MODE OF IMPLEMENTATION

The present invention is a novel retroreflective traffic stripe offering unprecedented brightness when illuminated by headlights from vehicles on highways under both dry and wet road conditions. The present invention represents an important improvement to the previous invention by the same inventor described in the '021 patent. The present invention comprises a thin transparent polymer sheet with prisms of three distinct types embossed onto the top and bottom surfaces of the sheet. The invention is best understood by referring to the attached drawings, which were briefly discussed in the previous paragraphs. FIG. 1 shows the basic configuration of the invention in various views.

FIG. 1-A shows the traffic stripe in a side view including the repeating widely spaced apart light-turning prismatic pattern 3 on the top surface and two different types of cube corner retroreflective prisms 5 and 6 on the bottom surface. The bottom surface is divided into two repeating regions with Region 1 located beneath the repeating pattern 3 of light-turning prisms and with Region 2 located between the repeating pattern 3 of light-turning prisms. Each of the cube corner prisms 5 has an optical axis approximately perpendicular to the surfaces of the traffic stripe. Each of the cube corner prisms 6 has an optical axis tilted by approximately ±35.3 degrees. FIGS. 1-B, 1-C, and 1-D show blow-ups of the two different types of cube corner prisms with internal rays 12 inside the polymer material also shown. These rays 12 correspond to both incident rays from the distant headlights and retroreflected rays headed back to the driver and sensors of the vehicle with the headlights, since both sets of rays follow the same paths in reverse directions. It should be noted that air needs to surround both types of cube corners to enable total internal reflection (TIR) to occur at the surfaces of the cube corner prisms. Cube corner prisms of the tilted optical axis type 6 need to have intermittent air gaps 25 at both ends as shown in FIG. 1-C.

FIG. 2-A shows a view as would be seen by the driver and sensors of a vehicle on a highway with the traffic stripe 7 described in the '021 patent and incorporated into the present invention installed at the boundary of a lane parallel to the direction of travel. The preferred method of installation is to place the traffic stripe 7 in a pavement groove 8 cut into the pavement 9 using a white adhesive 10. This method of installation provides some protection against damage by snowplows and traffic. The white adhesive 10 provides some retroreflection in case the traffic stripe 7 is dislodged by traffic damage.

FIG. 2-B shows a side view of the preferred repeating pattern of light-turning prisms comprising light-turning prisms 11 facing both directions of traffic. Incident and retroreflected rays 12 are shown for a vehicle coming from the right with headlights providing grazing angle illumination at 88.76 degrees angle of incidence corresponding to the standard test condition for traffic stripes. In the U.S., the standard test for retroreflectivity of road markings is described in ASTM E 1710. The light-turning prism 11 efficiently accepts with its nearly vertical face the incident rays 12 and reflects them downward from its tilted face using the process of total internal reflection (TIR). These rays 12 then intercept cube corner prisms 5 at the bottom surface and are retroreflected in the reverse direction as rays 12 to the vehicle and its driver and sensors. FIG. 2-B also shows a protective structural bar 13 which is taller than the light-turning prisms 11 to absorb tire pressure and mitigate traffic damage to the light-turning prisms 11.

FIG. 2-C shows one version of the traffic stripe for an application parallel to the roadway such as a lane or edge stripe as previously shown in FIG. 2-A. The repeating light-turning prismatic pattern is spaced about 4.93 cm apart along the traffic stripe. FIG. 2-D shows a different version of the traffic stripe for an application perpendicular to the roadway such as a cross walk. This different version still has the repeating light-turning prismatic pattern running perpendicular to the roadway, but now the longer dimension of the traffic stripe is perpendicular to the roadway rather than parallel to the roadway.

FIG. 3 shows another critical component of the traffic stripe, a backside white polymer film 14 which is incrementally bonded to the bottom surface of the prismatic polymer to create air pockets around the cube corner prisms 4 to enable total internal reflection (TIR) to occur for these prisms 4. Such film 14 is widely used in retroreflective road sign sheeting with the bonding method often being ultrasonic welding represented by the small flat areas in FIG. 3. The white color of film 14 provides traffic stripe visibility in the daytime with sunlight illumination.

FIG. 3-A shows a side view of the traffic stripe including two repeating patterns 3 of light-turning prisms. FIG. 3-B shows a blow up of one of these light-turning patterns 3 including light-turning prisms 11 and protective structural bar 13. FIG. 3-C shows a further blow-up including cube corner prisms 4 and white polymer film 14.

FIG. 4 shows three dimensional views of the light-turning prisms 11 and cube corner prisms 4 interacting with incident and retroreflected rays 12. FIG. 4-A shows one transparent view with rays 12 while FIG. 4-B shows the same view without rays, including protective structural bar 13. FIG. 4-C shows a different transparent view with rays 12 while FIG. 4-D shows the same view without rays. It should be noted that the cube corner prisms 4 are much smaller in length than the light-turning prisms 11, a key feature described in the '021 patent and incorporated into the present invention.

FIG. 5 provides additional details on the optical functionality of the traffic stripe under dry conditions for a vehicle approaching from the right. FIG. 5-A shows a side view of a section of the traffic stripe including two patterns 3 of light-turning prisms separated by a substantial distance. Incident and retroreflected rays 12 pass over the light-turning prismatic pattern 3 on the right without major blockage, and are then efficiently accepted and retroreflected by the light-turning prismatic pattern 3 on the left in combination with the cube corner prisms under light-turning prismatic pattern 3. The wide spacing between light-turning prismatic patterns 3 is necessary to mitigate blockage of incident and retroreflected rays 12 by the neighboring light-turning prismatic pattern 3. As described in the '021 patent, optical performance is optimized by reducing such ray blockage for both incoming and retroreflected rays 12.

FIG. 5-B shows a blow-up of the left pattern 3 of light-turning prisms and FIG. 5-C shows a blow-up of the right pattern 3 of light-turning prisms. FIG. 5-D shows a larger blow-up of the cube corner prisms beneath the light-turning prisms.

FIG. 6 provides additional details on the optical functionality of the traffic stripe under dry conditions for a vehicle approaching from the left. FIG. 6-A shows a side view of a section of the traffic stripe including two patterns 3 of light-turning prisms separated by a substantial distance. Incident and retroreflected rays 12 pass over the light-turning prismatic pattern 3 on the left without major blockage, and are then efficiently accepted and retroreflected by the light-turning prismatic pattern 3 on the right in combination with the cube corner prisms under the light-turning prismatic pattern 3. The wide spacing between light-turning prismatic patterns 3 is necessary to mitigate blockage of incident and retroreflected rays 12 by the neighboring light-turning prismatic pattern 3. As described in the '021 patent, optical performance is optimized by reducing such ray blockage for both incoming and retroreflected rays 12.

FIG. 6-B shows a blow-up of the left pattern 3 of light-turning prisms and FIG. 6-C shows a blow-up of the right pattern 3 of light-turning prisms. FIG. 6-D shows a larger blow-up of the cube corner prisms beneath the light-turning prisms.

FIG. 7 shows the most important new feature and benefit of the present invention which were not anticipated in the '021 patent. When the traffic stripe is underwater, as shown by water level 15, due to wet weather conditions, the light-turning prisms 3 are no longer optically functional, making the cube corner prisms 5 also non-functional since no rays nearly perpendicular to the surfaces of the traffic stripe are available for retroreflection. To overcome this poor optical performance under wet conditions, a second set of different type cube corner prisms 6 is used between light-turning prismatic patterns 3. Rather than having an optical axis perpendicular to the surfaces of the traffic stripe as in corner prisms 5, substantially tilted cube corner prisms 6 are employed on the bottom surface of the traffic stripe between light turning prismatic patterns 3 to provide substantial retroreflectivity in the underwater condition.

FIG. 7 shows incident and retroreflected rays 12 intercepting the water surface 15 at a very high incidence angle corresponding to the standard test condition for pavement markings of 88.76 degrees. In the U.S., this standard test is specified in ASTM E 1710. These rays 12 are refracted by the water due to its refractive index of about 1.33, causing the refracted rays 16 to have a less severe angle of incidence according to Snell's law. Rays 16 are further refracted by the polymer comprising the traffic stripe due to its yet higher refractive index of about 1.50 to form rays 17.

The table below quantifies these various angles for the preferred polymer of thermoplastic polyurethane (TPU). The top row corresponds to the standard test condition for traffic stripe retroreflectivity measurement corresponding to headlights at a 30-meter distance from the test point of the traffic stripe with the headlights 0.65 meter above the roadway. In the U.S., this test is specified in ASTM E 1710. The second row corresponds to a limiting comparison for truly grazing rays at 90 degrees incidence showing that the internal angle of incidence within the polymer never exceeds 42 degrees for the assumed TPU material. The internal incidence angles inside the polymer are not much different (within −3 to +4 degrees) for alternate polymer materials with slightly different refractive indices such as silicone, fluoropolymer, acrylic, or polycarbonate.

| Condition | Incidence Angle in Air | Incidence Angle Under Water Layer | Incidence Angle Inside Polymer | Water Refractive Index | Polymer Refractive Index |
|---|---|---|---|---|---|
| Standard 30 meter Test of Road Stripes | 88.759 deg | 48.591 deg | 41.935 deg | 1.333 | 1.495 |
| True Grazing Incidence | 90.000 deg | 48.507 deg | 41.947 deg | 1.333 | 1.496 |

FIGS. 8, 9, 10, and 11 show details of the preferred geometry of cube corner prisms 4 of both types 5 and 6 for the present invention. The preferred geometry eliminates dead spots which exist for complete half-cube cube corner prisms, thereby maximizing retroreflectivity. FIG. 8 shows the first step in the design progression from a complete cube corner 18 to a fully effective rectangular aperture cube corner known in the industry of road sign sheeting as a "full cube." A complete cube corner 18 is formed by diagonally slicing one corner away from a complete cube. The aperture of a complete cube corner 18 is triangular in shape with an optical axis 19 perpendicular to the aperture at its center. When illuminated by rays parallel to the optical axis 19, rays entering the darkened corners 20 do not achieve full retroreflectivity because these rays only undergo two reflections from two of the cube corner faces rather than three reflections from all three faces as needed for full retroreflection. These dead areas 20 together correspond to one-third of the triangular aperture and thus represent a 33% optical loss in retroreflectivity for the triangular aperture complete cube corner prism. Fortunately, these dead areas 20 may be sliced away from the triangular aperture cube corner 18 to improve optical performance. In the retroreflective sheeting industry for road signs, a rectangular area 21 is generally used for the trimming outline. Rectangles are easier to arrange together in large arrays than other geometries. Therefore, large sheets using arrays of millions of very small rectangular aperture cube corners dominate the road sign sheeting market.

FIG. 9 shows the geometric slicing approach used to define the "full cube" 23 which is 100% effective when illuminated by rays parallel to the optical axis 19. Parts 22 are discarded from the three-dimensional complete cube corner leaving the desired smaller "full cube" 23. It should be noted that this slicing is merely a mathematical exercise to explain the geometry, not something that is actually done with real prisms.

FIG. 10 shows how pairs of "full cubes" are configured by joining together two full cubes with one rotated 180 degrees relative to the other. FIG. 10-A shows the slicing geometry in a top view with discarded parts 22 and retained "full cube" 23. When rotated 180 degrees, cube corner 23 becomes cube corner 24, which allows joining of these two cube corners to form a pair of full cube prisms, which comprise the basic building block 5 for the pattern of cube corners under the light-turning prisms 3 which are used in Region 1 of the traffic stripe. FIG. 10-B shows a top view of the two cube corner prisms 23 and 24 joined together. FIG. 10-C shows an isometric view of the two cube corner prisms 23 and 24 joined together.

FIG. 11 shows the progression from the full cube corner pairs 5 used beneath the light-turning prismatic patterns 3 to rotated full cube corner pairs 6 used between light-turning prisms 3. FIG. 11-A shows the starting pair 5. If the pair is separated into two halves, and each half is rotated by 35.264 degrees in the opposite direction, the results are shown in FIG. 11-B and FIG. 11-C. If these two halves are then merged together into a horizontal assembly, cube corner pair 6 is formed for use between light-turning prismatic patterns 3. FIG. 11-D shows this preferred cube corner pair 6. The 35.264-degree rotation causes one face of each cube corner to become vertical and causes the joint between the other two faces of each cube corner to become horizontal. This is a convenient geometry corresponding to a linear prism with a 90-degree included angle running left to right in FIG. 11. To function properly, an air gap must surround this prism 6, including its two vertical ends. An array of such prisms 6 forms the geometry of cube corners on the bottom of the traffic stripe in Region 2 between light-turning prisms 3.

To guide the design of the best configuration for the cube corner prisms 5 and 6 for use in Regions 1 and 2, respectively, the inventor has created a sophisticated three-dimensional ray trace model which follows a large number of incident rays filling the aperture of the cube corner prism as these rays encounter the three surfaces of the cube corner prism. If an incident ray is successfully reflected by total internal reflection (TIR) from all three faces of the cube corner prism, it is considered effective. If an incident ray is only reflected by one or two of the three faces of the cube corner prism, it is considered ineffective. If an incident ray intersects any one of the three faces of the cube corner prism at an angle which does not enable total internal reflection (TIR), it is considered ineffective. The fraction of incident rays filling the aperture which are effective is defined by the inventor as the effectiveness. The ray trace model allows the cube corner prism 23 in FIG. 9 to be tilted in either direction by any angle about the x-axis shown in FIG. 9. The ray trace model also allows incident rays to follow any internal incidence angle. Key results of the inventor's parametric analysis are provided in FIGS. 12 and 13.

FIG. 12 explains why the preferred cube corner prisms 5 and 6 have the geometries explained previously. FIG. 12 shows that the effectiveness of the cube corner prisms versus internal incidence angle inside the polymer. Effectiveness is defined by the inventor as the fraction of incident rays which undergo complete retroreflection. For the cube corner prisms 5 which have optical axes perpendicular to the surfaces of the traffic stripe, the effectiveness is 100% for 0 degrees internal incidence angle and falls off for small changes in internal incidence angle. For the ±35.3 degree rotated optical axis cube corner prisms 6, the effectiveness is 100% for ±35.3 degrees internal incidence angle and falls off for small changes in internal incidence angle. These curves for the rotated cube corners end at about ±42 degrees because this is maximum possible value for rays which enter the water layer 15 from above due to Snell's law for the assumed thermoplastic polyurethane polymer. Fortunately, the effectiveness is still about 96% for ±42 degrees incidence angle. Thus prisms 6 will provide outstanding effectiveness for the underwater condition for which they are intended. But effectiveness is not the only consideration regarding performance under the submerged condition.

FIG. 12 also shows the round-trip transmittance versus internal incidence angle for top exposed surfaces of either water corresponding to the submerged condition or polymer corresponding to the dry condition. The round-trip transmittance for the water surface includes losses for the incident rays and losses for the retroreflected rays when they enter the water from the air or leave the water to enter the air, respectively. The round-trip transmittance for the polymer surface includes losses for the incident rays and losses for the retroreflected rays when they enter the polymer from the air or leave the polymer to enter the air, respectively. The round-trip transmittance is higher for water than for polymer due to the smaller refractive index of the former. But the transmittance still falls off rapidly near the ±42-degree maximum incidence angles.

FIG. 12 also shows why two different types of cube corner prisms are needed for the dry and wet conditions. Cube corners 5 with optical axes substantially perpendicular to the surfaces of the traffic stripe will not provide any effectiveness for the submerged condition of the traffic stripe when the internal incidence angle is about ±42 degrees. Highly tilted cube corners 6 are essential to provide high effectiveness for this underwater condition. The preferred embodiment of 35.3-degree tilt angle is close enough to the 42-degree internal incidence angle to provide excellent effectiveness. Other polymers such as silicone, fluoropolymer, acrylic, or polycarbonate can be used in place of the thermoplastic polyurethane with similarly high performance and fall within the scope and spirit of the present invention. While other tilt angles will work, the ±35.3-degree tilt angle of the preferred embodiment should be easier to tool and mass-produce. Other large tilt angles fall within the scope and spirit of the present invention.

FIG. 13 combines the effectiveness of the cube corner prisms 5 and 6 with the round-trip transmittance of the water layer to provide the overall efficiency of the two types of prisms versus external incidence angle in the air above the water. Note that the prisms 5 with optical axes perpendicular to the surfaces of the traffic stripe have a zero overall efficiency above about 35 degrees external incidence angle. Therefore, this type of cube corner prism will not work for underwater operation. Note that the 35.3-degree tilted axis prisms have peak overall efficiency of about 88% at about 60 degrees external incidence angle but continue to function out to the important 88.76-degree external incidence angle of the standard test condition for pavement markings as described in ASTM E 1710. At this near grazing incidence angle, the overall efficiency is still about 1.6% for the highly tilted prisms. While this may appear to be a small overall efficiency, it is still adequate to provide an estimated 10× higher retroreflectivity than the Federal Highway Administration's targeted value of 100 mcd/m$^2$-lux for dry traffic stripes. Such high wet retroreflectivity could save many lives on stormy nights in both human-driven vehicles and connected and autonomous vehicles (CAVs).

FIG. 14 shows the currently preferred embodiment of the present invention including key dimensions. FIG. 14-A shows a side view of a section of the new traffic stripe with two of the repeating patterns of light-turning prisms 3 spaced apart by about 4.93 cm in the direction along the traffic stripe. FIG. 14-B shows a blow-up view of the left-side pattern of light-turning prisms 3 and FIG. 14-C shows a blow-up view of the right-side pattern of light-turning prisms. The two different types of cube corner retroreflective prisms are also highlighted in FIGS. 14-A, 14-B, and 14-C. Specifically, cube corner prisms 5 with optical axes perpendicular to the surfaces of the traffic stripe are shown to be located beneath each light-turning prismatic pattern 3 and extend beyond the length of the light-turning pattern 3 on both ends to provide a large misalignment tolerance between the light-turning prismatic pattern 3 and the cube corner pattern 5. Note in FIG. 14-A that the length of the cube corner pattern 5 is about 0.72 cm corresponding to about 15% of the total spacing of about 4.93 cm between repeating light-turning prismatic patterns 3. This 0.72 cm length of cube corner prisms 5 is about 50% longer than the length of the light-turning prismatic pattern 3. This excess length provides a wide tolerance for lengthwise misalignment of the light-turning prismatic pattern 3 and the cube corner prisms 5. Note in FIG. 14-A that the length of cube corner pattern 6 is about 4.20 cm corresponding to about 85% of the total spacing of about 4.93 cm between repeating light-turning prismatic patterns 3.

FIG. 14-B shows cube corner prisms 5 which are located beneath repeating light-turning prismatic patterns 3. Each of these cube corner prisms 5 has an optical axis substantially perpendicular to the surfaces of the traffic stripe to provide acceptable retroreflective performance under dry conditions.

FIG. 14-C shows cube corner prisms 6 which are located between repeating light-turning prismatic patterns 3. Each of these cube corner prisms 6 has an optical axis tilted by about ±35.3 degrees to provide acceptable retroreflective performance under wet conditions with the traffic stripe submerged beneath a layer of water.

FIG. 15 provides an enlarged view with more details of the dimensions of the repeating light-turning prismatic pattern 3 in the presently preferred embodiment of the present invention. FIG. 15 also includes blow-up views of the two types of cube corner prisms 5 and 6 which are located beneath and between light-turning prismatic patterns 3, respectively.

While the greatest market for the invention is expected to be road marking stripes, including lane delineation stripes, road edge stripes, crosswalk stripes, and intersection stripes, many other applications will also be identified by those of ordinary skill in the art. These other applications fall within the spirit and scope of the invention. For example, the new traffic stripe can also be used on vertical surfaces running alongside roadways such as concrete barriers and guardrails. For these applications, the invention can be used in a tape form to minimize installation time and cost. The embossed or molded polymer film with light-turning prisms 3 on one side and cube corner prisms 4 on the opposite side can be unrolled and pressed against the concrete barrier or guardrail using a pressure sensitive adhesive (PSA) to provide the attachment quickly and easily. In essence, the installer will unroll a strip of traffic stripe tape, stick it onto the vertical structure, and walk away with the job done. These vertical applications are simpler and less demanding than horizontal traffic stripe roadway applications since no traffic damage or snowplow damage will occur to these vertical traffic stripes.

Those of ordinary skill in the art of traffic stripes will identify other applications for the present invention which fall within the scope and spirit of the invention. For example, intermittent traffic stripes denoting passing lanes which are often called skip stripes can fully utilize the features and benefits of the present invention. Similarly, shorter sections of the present invention could take the place of raised pavement markers to provide reflective "spots" along highways. These variations and others fall within the scope and spirit of the present invention.

The preferred embodiment of the invention will utilize air pockets between the cube corner prisms 4 and an underlying film 14 which may be white to provide daytime visibility for the traffic stripe. The preferred embodiment may also include a colored pigment in the prismatic polymer sheet. For example, a yellow pigment can be used for yellow lane stripe applications and a red pigment may be used on certain guard rails stripes, if such colors are desired. Such colored pigments are already used in road sign retroreflective sheeting.

The invention will also typically employ additional layers beneath the film 14 which provides the air pockets facing the cube corner prisms 4. Such additional layers may include pressure sensitive adhesive (PSA) to facilitate attachment to a highway or a guardrail. Such additional layers may include softer compliant layers to mitigate traffic damage to the prismatic structures used in the invention.

There are at least two acceptable methods of mass producing the prismatic polymer film employed in the invention. One method is to first produce a separate prismatic film containing the repeating pattern 3 of light-turning prisms on one side of this first film, with the opposite side smooth and planar. A second separate prismatic film is produced containing cube corner prisms 5 and 6 on one side, with the opposite side smooth and planar. The smooth and planar surfaces of the first and second films are later bonded together, using a transparent bonding agent such as solvent or liquid adhesive or pressure sensitive adhesive to bond the two films together with proper alignment between repeating light-turning pattern 3 and cube corner prisms 5. Both the first and second prismatic films can be produced by thermally embossing a transparent polymer film, the same embossing method commonly used to produce the reflective sign sheeting. Other processes can also be used to produce the prismatic films including injection molding, compression molding, and casting.

An alternate method of mass producing the prismatic polymer film is to simultaneously form both sets of prisms, namely the light-turning prisms 3 on one side of the film and the cube corner prisms 5 and 6 on the opposite side of the film in proper alignment with light-turning prisms 3. This alternate method will require tooling with both prismatic patterns on opposite sides of the polymer being formed into the traffic stripe. The inventor has had discussions with long-time suppliers of prismatic sheeting for road signs and found that the simultaneous embossing of both patterns onto a single polymer film should be practical and cost-effective. The first method of producing the prismatic polymer film may be easier to implement in the short term, but the second method will be more cost-effective in the long term and offer a more robust product since no bonding layer will be present.

While the above paragraphs have fully described the invention and its best mode of implementation so that one of ordinary skill in the art can fully practice the invention, many other variations and embodiments of the invention will become apparent to others of ordinary skill in the art based upon the disclosure of this invention. Such variations and embodiments fall within the scope and spirit of the invention.

I claim:

1. A traffic stripe with high retroreflectivity at night when illuminated by distant headlights under both dry and wet conditions,
   a. Said traffic stripe comprising a transparent polymer film with one prismatic pattern on its exposed top surface and two different prismatic patterns on its bottom surface proximate the mounting surface,
   b. Said top surface prismatic pattern comprising a repeating set of spaced apart light-turning prisms which accept light from said distant headlights and refract and reflect said light into a downward direction onto said bottom surface,
   c. Said bottom surface prismatic pattern comprising a first set of cube corner prisms with optical axes within 15 degrees of perpendicular to said top and bottom surfaces and located substantially beneath said repeating set of light-turning prismatic patterns,
   d. Said bottom surface prismatic pattern further comprising a second set of cube corner prisms with optical axes tilted toward said distant headlights by at least 28 degrees off perpendicular to said top and bottom surfaces, said second set located substantially between said repeating set of light-turning prismatic patterns.

2. The retroreflective traffic stripe of claim 1 comprising repeating pairs of said light-turning prisms facing in both directions of traffic and comprising repeating pairs of said second set of cube corner prisms tilted in both directions of traffic.

3. The retroreflective traffic stripe of claim 1 comprising repeating structural elements proximate to and taller than said repeating light-turning prisms to mitigate traffic damage to said light-turning prisms.

4. The retroreflective traffic stripe of claim 1 wherein said polymeric material is selected from thermoplastic polyurethane, acrylic, polycarbonate, silicone, fluoropolymer, and combinations thereof.

5. The retroreflective traffic stripe of claim 1 wherein said light-turning prisms and said cube-corner prisms are formed into said polymeric material by a manufacturing process selected from roll-to-roll embossing, injection molding, compression molding, or casting.

6. The retroreflective traffic stripe of claim 1 wherein said second set of cube corner prisms are tilted toward said distant headlights by 35.264 degrees.

7. The retroreflective traffic stripe of claim 1 wherein said traffic stripe further comprises an enclosed air gap beneath said retroreflective cube corner prisms to promote total internal reflection therefrom.

8. The retroreflective traffic stripe of claim 1 wherein said bottom surface is proximate to a road surface.

9. The retroreflective traffic stripe of claim 1 wherein said bottom surface is proximate to a vertical mounting surface of a traffic barrier.

10. A retroreflective traffic stripe configured to be horizontally attached to a highway, said traffic stripe having a length parallel to the direction of traffic and a width perpendicular to the direction of traffic, said traffic stripe comprising the following:
    a. A substantially transparent polymeric material having an upper surface exposed to the ambient environment and a lower surface facing said highway below,
    b. Said upper surface comprising a plurality of linear light-turning prisms extending substantially across the width of said traffic stripe in a spaced apart repeating pattern along the length of said traffic stripe,
    c. Said lower surface comprising a plurality of cube-corner retroreflective prisms of two types in a spaced apart repeating pattern along the length of said traffic stripe,
       i. Said first type of cube-corner prisms having optical axes within 15 degrees of vertical and being located substantially beneath said repeating pattern of light-turning prisms,
       ii. Said second type of cube-corner prisms having optical axes which are tilted in the direction of oncoming traffic by at least 28 degrees from vertical and being located substantially between said repeating pattern of light-turning prisms,
    d. Said cube-corner retroreflective prisms being surrounded by air spaces below said prisms to enable total internal reflection by said prisms.

11. The retroreflective traffic stripe of claim 10 comprising repeating pairs of said light-turning prisms facing in both directions of traffic and comprising repeating pairs of said second type of cube corner prisms tilted in both directions of traffic.

12. The retroreflective traffic stripe of claim 10 comprising repeating structural elements proximate to and taller than said repeating light-turning prisms to mitigate traffic damage to said light-turning prisms.

13. The retroreflective traffic stripe of claim 10 wherein said polymeric material is selected from thermoplastic polyurethane, acrylic, polycarbonate, silicone, fluoropolymer, and combinations thereof.

14. The retroreflective traffic stripe of claim 10 wherein said light-turning prisms and said cube-corner prisms are formed into said polymeric material by a manufacturing process selected from roll-to-roll embossing, injection molding, compression molding, or casting.

15. A retroreflective traffic stripe comprising a polymer film comprising the combination of three different types of prisms, one on the exposed top face of said film and two on the bottom surface of said film, to accept light from distant headlights and to return a portion of said light to the driver and sensors of the vehicle under both dry and wet road conditions, said prisms comprising:
    a. on said exposed top surface, a spaced apart repeating pattern of light-turning prisms which accept light from said distant headlights and refract and reflect said light downward onto said bottom surface,
    b. on said bottom surface, retroreflective cube corner prisms of two different types placed in two different locations:
       i. a first type of retroreflective cube corner prisms located substantially beneath said light-turning prisms and having optical axes within 15 degrees of perpendicular to said top and bottom surfaces of said polymer film,
       ii. a second type of retroreflective cube corner prisms located substantially between said repeating pattern of light-turning prisms and having optical axes tilted toward said headlights by at least 28 degrees relative to said perpendicular to said top and bottom surfaces of said polymer film.

16. The retroreflective traffic stripe of claim 15 comprising repeating pairs of said light-turning prisms facing in both directions of traffic and comprising repeating pairs of said second type of cube corner prisms tilted in both directions of traffic.

17. The retroreflective traffic stripe of claim 15 comprising repeating structural elements proximate to and taller than said repeating light-turning prisms to mitigate traffic damage to said light-turning prisms.

18. The retroreflective traffic stripe of claim 15 wherein said polymeric material is selected from thermoplastic polyurethane, acrylic, polycarbonate, silicone, fluoropolymer, and combinations thereof.

19. The retroreflective traffic stripe of claim 15 wherein said light-turning prisms and said cube-corner prisms are formed into said polymeric material by a manufacturing process selected from roll-to-roll embossing, injection molding, compression molding, or casting.

* * * * *